US010460396B2

(12) United States Patent
Rosier et al.

(10) Patent No.: US 10,460,396 B2
(45) Date of Patent: Oct. 29, 2019

(54) DATA PROCESSING FOR DATA REPLICATION SYSTEM

(71) Applicant: SAP SE, Walldorf (DE)

(72) Inventors: Michael Rosier, Menden (DE); Matthias Richter, Sinsheim (DE); Gabriela Bellemann de Leon, St. Leon-Rot (DE); Eva Angelina Hase, St. Leon-Rot (DE); Gisella Dominguez Anzuinelli, Sankt Leon-Rot (DE); Nicolai Michaelis, Heidelberg (DE); Gunilla Carbol, Leopoldshafen (DE); Frank Schuhmacher, St. Leon-Rot (DE); Lorenz Pfeil, Bruchsal (DE); Mathias Schoenecker, Hambrucken (DE)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 15/385,771

(22) Filed: Dec. 20, 2016

(65) Prior Publication Data

US 2018/0174242 A1 Jun. 21, 2018

(51) Int. Cl.
*G06Q 40/00* (2012.01)
*G06Q 10/10* (2012.01)

(52) U.S. Cl.
CPC .......... *G06Q 40/12* (2013.12); *G06Q 10/10* (2013.01)

(58) Field of Classification Search
CPC ........ G06Q 40/12; G06Q 10/10; G06Q 40/02; G06F 17/243

USPC ................ 705/30, 34, 33; 715/234; 709/203
See application file for complete search history.

(56) References Cited

U.S. PATENT DOCUMENTS

| | | | | |
|---|---|---|---|---|
| 2004/0243489 A1* | 12/2004 | Mitchell | ............... | G06Q 10/10 705/30 |
| 2008/0046347 A1* | 2/2008 | Smith | ............... | G06Q 20/14 705/30 |
| 2010/0030589 A1* | 2/2010 | Narayanaswami | .... | G06Q 10/00 705/5 |
| 2012/0185368 A1* | 7/2012 | Schloter | ............... | G06Q 40/12 705/30 |
| 2012/0317003 A1* | 12/2012 | McGrane | ............... | G06Q 10/06 705/30 |
| 2013/0085908 A1* | 4/2013 | Singh | ............... | G06Q 10/06 705/30 |
| 2013/0179313 A1* | 7/2013 | Basu | ............... | G06Q 40/10 705/30 |
| 2014/0041812 A1* | 2/2014 | Strand | ............... | E06B 9/262 160/84.01 |
| 2014/0136381 A1* | 5/2014 | Joseph | ............... | G06Q 40/02 705/35 |
| 2014/0258838 A1* | 9/2014 | Evers | ............... | G06F 17/243 715/234 |

(Continued)

*Primary Examiner* — Vanel Frenel
(74) *Attorney, Agent, or Firm* — Fountainhead Law Group P.C.

(57) ABSTRACT

Some embodiments provide a non-transitory machine-readable medium that stores a program. The program receives from a system data comprising a set of expense entries. The program further determines, for each expense entry in the set of expense entries, an entry use case. The program also processes, for each expense entry in the set of expense entries, the expense entry based on the determined entry use case. The program further generates a document based on the processed set of expense entries.

20 Claims, 22 Drawing Sheets

(56) References Cited

U.S. PATENT DOCUMENTS

2015/0142870 A1* 5/2015 Hashimoto ............ H04L 51/08
　　　　　　　　　　　　　　　　　　　　　709/203

* cited by examiner

Field Mappings

| Form Type | CS 105 Field ID | CS 105 Field Name | CS 120 Table Name | CS 120 Field Name | PC | CC | CM |
|---|---|---|---|---|---|---|---|
| Payment Vendor | AcctNumber | Account Number | LFB1 | EIKTO | PCD 3 | CCD 4 | CMD 1 |
| Payment Vendor | Address1 | Address1 | ADDR1_VAL | Street | PCD 4 | | CMD 8 |
| Payment Vendor | Address2 | Address2 | ADDR1_VAL | House_Num1 | PCD 7 | | |
| Payment Vendor | Address3 | Address3 | | | | | |
| Payment Vendor | City | City | ADDR1_VAL | City1 | PCD 1 | | |
| Payment Vendor | ContactEmail | ContactEmail | LFB1 | INTAD | | | CMD 6 |
| Payment Vendor | ContactFirstName | ContactFirstName | | | | | |
| Payment Vendor | ContactLastName | ContactLastName | LFB1 | ZSABE | PCD 5 | | |
| Payment Vendor | Country | Country | ADDR1_VAL | Country | | | |
| Payment Vendor | CrnKey | Currency | T001 | WAERS | | CCD 2 | CMD 3 |
| Payment Vendor | Custom1 | Custom1 | | | | | |

```xml
<expenseEntry>
<entryId>921E50C353C3AB4B81C2D3E23C9380B2</entryId>
<entryOrgUnit1Value>EhP6TestSysTravelCareerOD</entryOrgUnit1Value>
<entryOrgUnit2Value>TemOD Germany 2</entryOrgUnit2Value>
<entryOrgUnit3Value>Cost Center</entryOrgUnit3Value>
<entryOrgUnit4Value>Kingston DE 11 description 2</entryOrgUnit4Value>
<entryLocationName>Frankfurt/Main</entryLocationName>
<expensePayIndicator>N</expensePayIndicator>
<entryApprovedAmount>25</entryApprovedAmount>
<offsetPayType>N</offsetPayType>
<entryCountryCode>DE</entryCountryCode>
<entryCustom35Code>DE</entryCustom35Code>
<entryCustom38Code>VA</entryCustom38Code>
<entryCustom39Code>3.99000000</entryCustom39Code>
<entryCustom40Code>21.01000000</entryCustom40Code>
<entryLocationCityName>Frankfurt/Main</entryLocationCityName>
<entryCountrySubCode>DE-HE</entryCountrySubCode>
<entryIsBillable>N</entryIsBillable>
<entryOrgUnit1Code>Q16CLNT500</entryOrgUnit1Code>
<entryOrgUnit2Code>0011</entryOrgUnit2Code>
<entryOrgUnit3Code>CC</entryOrgUnit3Code>
<entryOrgUnit4Code>11-KING</entryOrgUnit4Code>
<clearingAccountCode>1999</clearingAccountCode>
<allocation>
<allocationPercentage>100</allocationPercentage>
<allocationId>0BF4C90C69E0BD4A9EAFCCEF181020DD</allocationId>
<allocationCustom1Code>Q16CLNT500</allocationCustom1Code>
<allocationCustom2Code>0011</allocationCustom2Code>
<allocationCustom3Code>CC</allocationCustom3Code>
<allocationCustom4Code>11-KING</allocationCustom4Code>
<allocationCustom1Value>EhP6TestSysTravelCareerOD</allocationCustom1Value>
<allocationCustom2Value>TemOD Germany 2</allocationCustom2Value>
<allocationCustom3Value>Cost Center</allocationCustom3Value>
<allocationCustom4Value>Kingston DE 11 description2</allocationCustom4Value>
<journal>
<amountGross>25</amountGross>
<journalAccountCode>474230</journalAccountCode>
<journalPayee>EMPL</journalPayee>
<journalPayer>COMP</journalPayer>
<amountNetOfReclaim>21.01</amountNetOfReclaim>
<amountNetOfTax>21.01</amountNetOfTax>
<taxGuid>E47FDB84DAD7C348ACCCDE80F132040C</taxGuid>
</journal>
<tax>
<amountTax>3.99</amountTax>
<nonDomesticCode>VA</nonDomesticCode>
<taxSource>SYST</taxSource>
<taxReclaimCode>VA</taxReclaimCode>
<locationCountryCode>DE</locationCountryCode>
<taxAuthorityLabel>DEVAT</taxAuthorityLabel>
<amountReclaim>3.99</amountReclaim>
<locationCountrySubCode>DE-HE</locationCountrySubCode>
<taxCode>VA</taxCode>
<taxGuid>E47FDB84DAD7C348ACCCDE80F132040C</taxGuid>
</tax>
</allocation>
<expenseTypeName>Taxi</expenseTypeName>
<entryDate>2016-10-18T00:00:00.000Z</entryDate>
<entryCurrAlphaCode>EUR</entryCurrAlphaCode>
<entryExchangeRate>1</entryExchangeRate>
<expenseTypeCode>TAXIX</expenseTypeCode>
<entryExchangeRateDirection>M</entryExchangeRateDirection>
<entryReceiptType>R</entryReceiptType>
<entryIsPersonal>N</entryIsPersonal>
</expenseEntry>
```

FIG. 16A

```xml
<expenseEntry>
<entryId>BB8213CB1F36D84CB950186AD2F74F0B</entryId>
<entryOrgUnit1Value>EhP6TestSysTravelCareerOD</entryOrgUnit1Value>
<entryOrgUnit2Value>TemOD Germany 2</entryOrgUnit2Value>
<entryOrgUnit3Value>Cost Center</entryOrgUnit3Value>
<entryOrgUnit4Value>Kingston DE 11description 2</entryOrgUnit4Value>
<entryLocationName>Frankfurt/Main</entryLocationName>
<expensePayIndicator>N</expensePayIndicator>
<entryApprovedAmount>10</entryApprovedAmount>
<offsetPayType>N</offsetPayType>
<entryCountryCode>DE</entryCountryCode>
<entryCustom35Code>DE</entryCustom35Code>
<entryCustom38Code>VA</entryCustom38Code>
<entryCustom39Code>1.60000000</entryCustom39Code>
<entryCustom40Code>8.40000000</entryCustom40Code>
<entryLocationCityName>Frankfurt/Main</entryLocationCityName>
<entryCountrySubCode>DE-HE</entryCountrySubCode>
<entryIsBillable>N</entryIsBillable>
<entryOrgUnit1Code>Q16CLNT500</entryOrgUnit1Code>
<entryOrgUnit2Code>0011</entryOrgUnit2Code>
<entryOrgUnit3Code>CC</entryOrgUnit3Code>
<entryOrgUnit4Code>11-KING</entryOrgUnit4Code>
<clearingAccountCode>1999</clearingAccountCode>
<allocation>
<allocationPercentage>100</allocationPercentage>
<allocationId>B5F8D64F363CF242B39BCC0C6785AC61</allocationId>
<allocationCustom1Code>Q16CLNT500</allocationCustom1Code>
<allocationCustom2Code>0011</allocationCustom2Code>
<allocationCustom3Code>CC</allocationCustom3Code>
<allocationCustom4Code>11-KING</allocationCustom4Code>
<allocationCustom1Value>EhP6TestSysTravelCareerOD</allocationCustom1Value>
<allocationCustom2Value>TemOD Germany 2</allocationCustom2Value>
<allocationCustom3Value>Cost Center</allocationCustom3Value>
<allocationCustom4Value>Kingston DE 11 description 2</allocationCustom4Value>
<journal>
<amountGross>10</amountGross>
<journalAccountCode>474230</journalAccountCode>
<journalPayee>EMPL</journalPayee>
<journalPayer>COMP</journalPayer>
<amountNetOfReclaim>8.4</amountNetOfReclaim>
<amountNetOfTax>8.4</amountNetOfTax>
<taxGuid>5C756DEFC0507E4CB9C7AD77A84CE465</taxGuid>
</journal>
<tax>
<amountTax>1.6</amountTax>
<nonDomesticCode>VA</nonDomesticCode>
<taxSource>SYST</taxSource>
<taxReclaimCode>VA</taxReclaimCode>
<locationCountryCode>DE</locationCountryCode>
<taxAuthorityLabel>DEVAT</taxAuthorityLabel>
<amountReclaim>1.6</amountReclaim>
<locationCountrySubCode>DE-HE</locationCountrySubCode>
<taxCode>VA</taxCode>
<taxGuid>5C756DEFC0507E4CB9C7AD77A84CE465</taxGuid>
</tax>
</allocation>
<expenseTypeName>Bus</expenseTypeName>
<entryDate>2016-10-18T00:00:00.000Z</entryDate>
<entryCurrAlphaCode>EUR</entryCurrAlphaCode>
<entryExchangeRate>1</entryExchangeRate>
<expenseTypeCode>BUSXX</expenseTypeCode>
<entryExchangeRateDirection>M</entryExchangeRateDirection>
<entryReceiptType>R</entryReceiptType>
<entryIsPersonal>N</entryIsPersonal>
</expenseEntry>
```

```
<employee>
<employeeMI>4</employeeMI>
<employeeOrgUnit1Code>Q16CLNT500</employeeOrgUnit1Code>
<employeeOrgUnit2Code>0011</employeeOrgUnit2Code>
<employeeOrgUnit3Code>CC</employeeOrgUnit3Code>
<employeeOrgUnit4Code>11-KING</employeeOrgUnit4Code>
<employeeOrgUnit1Value>EhP6TestSysTravelCareerOD</employeeOrgUnit1Value>
<employeeOrgUnit2Value>TemOD Germany 2</employeeOrgUnit2Value>
<employeeOrgUnit3Value>Cost Center</employeeOrgUnit3Value>
<employeeOrgUnit4Value>Kingston DE 11 description 2</employeeOrgUnit4Value>
<employeeCustom1Code>DE</employeeCustom1Code>
<employeeCustom6Code>DE</employeeCustom6Code>
<employeeCustom17Code>49035462</employeeCustom17Code>
<employeeCustom1Value>German Employee</employeeCustom1Value>
<employeeFirstName>John</employeeFirstName>
<employeeLastName>Doe</employeeLastName>
<employeeId>23543</employeeId>
</employee>
<report>
<reportKey>8964</reportKey>
<cashAdvanceReturnsAmount>0</cashAdvanceReturnsAmount>
<employeeCurrencyAlphaCode>EUR</employeeCurrencyAlphaCode>
<versionId>4</versionId>
<homeCountryCode>DE</homeCountryCode>
<reportOrgUnit1Code>Q16CLNT500</reportOrgUnit1Code>
<reportOrgUnit2Code>0011</reportOrgUnit2Code>
<reportOrgUnit3Code>CC</reportOrgUnit3Code>
<reportOrgUnit4Code>11-KING</reportOrgUnit4Code>
<reportOrgUnit1Value>EhP6TestSysTravelCareerOD</reportOrgUnit1Value>
<reportOrgUnit2Value>TemOD Germany 2</reportOrgUnit2Value>
<reportOrgUnit3Value>Cost Center</reportOrgUnit3Value>
<reportOrgUnit4Value>Kingston DE 11 description 2</reportOrgUnit4Value>
<reportSubmitDate>2016-10-19T12:18:43.160Z</reportSubmitDate>
<reportUserDefinedDate>2016-10-19T00:00:00.000Z</reportUserDefinedDate>
<reportPaymentProcessingDate>2016-10-19T12:18:43.393Z</
reportPaymentProcessingDate>
<revisionNumber>1</revisionNumber>
<reportName>Bus + Taxi (both cash)</reportName>
<reportId>2817A987BFB147E78577</reportId>
<ledgerCode>DEFAULT</ledgerCode>
<totalApprovedAmount>35</totalApprovedAmount>
<isTest>N</isTest>
</report>
```

FIG. 16C

Document

Company Code: 0011

| Item | Account | G/L Account | Description | Amount | Tax Amount | Currency | Cost Center |
|---|---|---|---|---|---|---|---|
| 1 | 200453 | 196300 | John Doe | 35.00- | 0.00 | USD | |
| 2 | 474230 | 474230 | Travel costs | 21.01 | 0.00 | USD | 11-KING |
| 3 | 154000 | 154000 | Input tax | 3.99 | 3.99 | USD | |
| 4 | 474230 | 474230 | Travel costs | 8.40 | 0.00 | USD | 11-KING |
| 5 | 154000 | 154000 | Input tax | 1.60 | 1.60 | USD | |

DATA PROCESSING FOR DATA REPLICATION SYSTEM

BACKGROUND

Modern day computer technology has a variety of different computing systems. For instance, different organizations may use a number of different computing systems implemented using any number of different technologies. In some instances, some of these different computing systems may be integrated with one another. Integrating different computing systems may involve various different operations. For example, system integration may include integrating different applications, services, and/or data on the different systems, replicating data between the different systems. Different tools may be used for system integration such as enterprise application integration (EAI) tools, extract, transform, load (ETL) tools, middleware tools, etc.

SUMMARY

In some embodiments, a non-transitory machine-readable medium stores a program. The program receives from a system data comprising a set of expense entries. The program further determines, for each expense entry in the set of expense entries, an entry use case. The program also processes, for each expense entry in the set of expense entries, the expense entry based on the determined entry use case. The program further generates a document based on the processed set of expense entries.

In some embodiments, the program may further determine, for each expense entry in the set of expense entries, a tax use case. The program may also process, for each expense entry in the set of expense entries, the expense entry based on the determined tax use case. The program may further determine a report use case based on the set of expense entries. The program may also process the set of expense entries based on the determined report use case. Processing the set of entries based on the determined report use case may include consolidating expenses in at least two expense entries into a single expense.

In some embodiments, determining the entry use case for each expense entry in the set of expense entries may include identifying data indicating a payee associated with an expense. Determining the entry use case may be based on the data indicating the payee associated with the expense. The system may be a first system. The program may further store the data in a storage in a second system. The program may further store the generated document in a storage in a second system for later viewing.

In some embodiments, a method receives from a system data comprising a set of expense entries. The method further determines, for each expense entry in the set of expense entries, an entry use case. The method also processes, for each expense entry in the set of expense entries, the expense entry based on the determined entry use case. The method further generates a document based on the processed set of expense entries.

In some embodiments, the method may further determine, for each expense entry in the set of expense entries, a tax use case. The method may also process, for each expense entry in the set of expense entries, the expense entry based on the determined tax use case. The method may further determine a report use case based on the set of expense entries. The method may also process the set of expense entries based on the determined report use case. Processing the set of entries based on the determined report use case may include consolidating expenses in at least two expense entries into a single expense.

In some embodiments, determining the entry use case for each expense entry in the set of expense entries may include identifying data indicating a payee associated with an expense. Determining the entry use case may be based on the data indicating the payee associated with the expense. The system may be a first system. The method may further store the data in a storage in a second system. The method may further store the generated document in a storage in a second system for later viewing.

In some embodiments, a system includes a set of processing units and a non-transitory computer-readable medium that stores instructions. The instructions cause at least one processing unit to receive from a system data comprising a set of expense entries. The instructions further cause the at least one processing unit to determine, for each expense entry in the set of expense entries, an entry use case. The instructions also cause the at least one processing unit to process, for each expense entry in the set of expense entries, the expense entry based on the determined entry use case. The instructions further cause the at least one processing unit to generate a document based on the processed set of expense entries.

In some embodiments, the instructions may further cause the at least one processing unit to determine, for each expense entry in the set of expense entries, a tax use case. The instructions may also cause the at least one processing unit to process, for each expense entry in the set of expense entries, the expense entry based on the determined tax use case. The instructions may further cause the at least one processing unit to determine a report use case based on the set of expense entries. The instructions may also cause the at least one processing unit to process the set of expense entries based on the determined report use case. Processing the set of entries based on the determined report use case may include consolidating expenses in at least two expense entries into a single expense.

In some embodiments, determining the entry use case for each expense entry in the set of expense entries may include identifying data indicating a payee associated with an expense. Determining the entry use case may be based on the data indicating the payee associated with the expense. The system may be a first system. The instructions may further cause the at least one processing unit to store the data in a storage in a second system. The instructions may further cause the at least one processing unit to store the generated document in a storage in a second system for later viewing.

The following detailed description and accompanying drawings provide a better understanding of the nature and advantages of the present invention.

BRIEF DESCRIPTION OF THE DRAWINGS

FIG. 6 illustrates a GUI for specifying field mappings according to some embodiments.

FIGS. 16A-C illustrate an example expense report according to some embodiments

FIG. 18 illustrates an example document generated based on processed expense entries and a processed expense report according to some embodiments.

DETAILED DESCRIPTION

Figure 1:
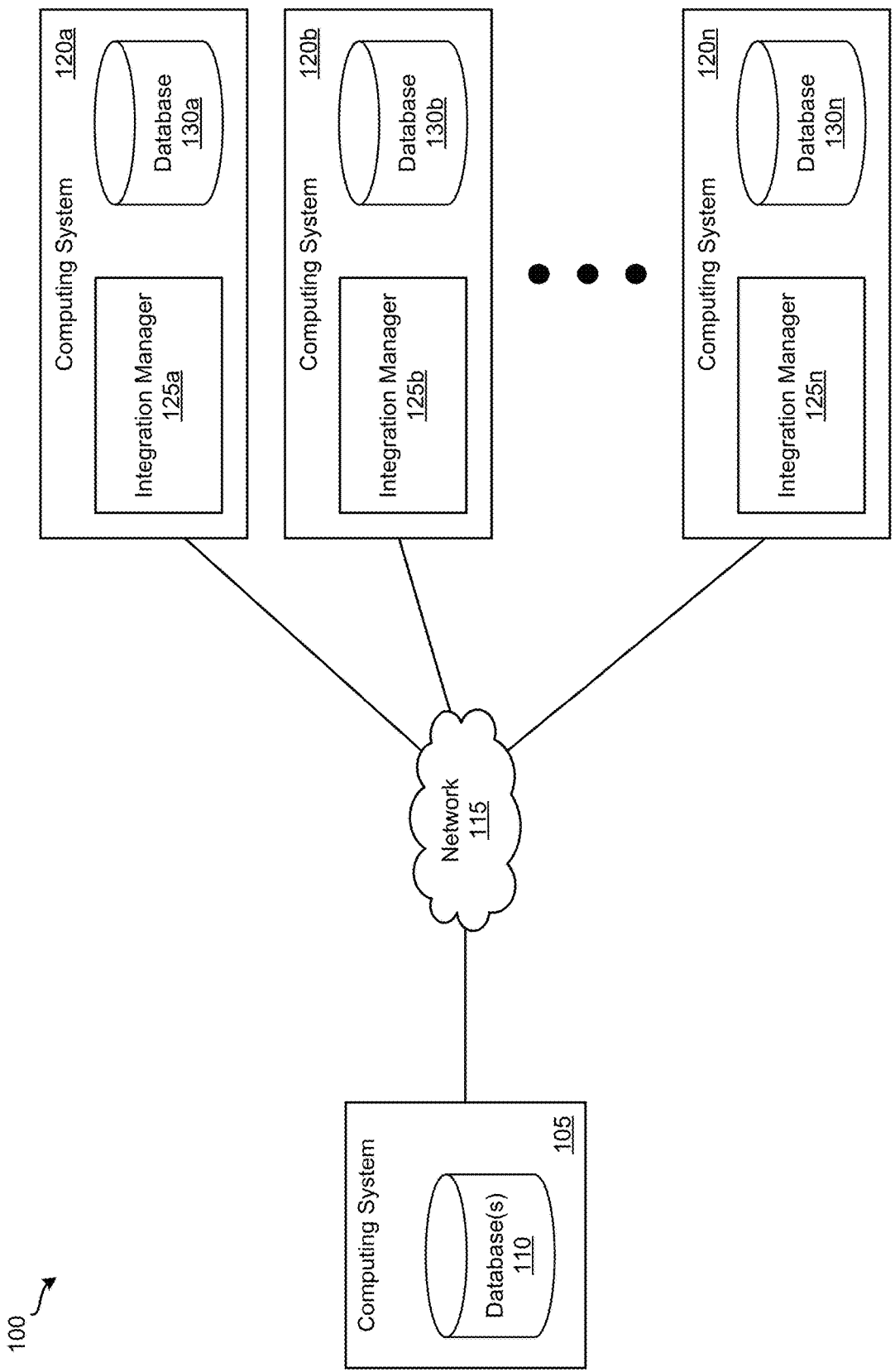
FIG. 1 illustrates a system for integrating computing systems according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for replicating data from a source computing system to a target computing system. In some embodiments, the source computing system provides a graphical user interface (GUI) for configuring the replication of data from the source computing system to the target computing system. Through the GUI, the source computing system may be configured to replicate one or more types of data to the target computing system. Once the source computing system has been configured, the source computing system may use the configuration to replicate data from the source computing system to the target computing system. After the data has been replicated, the source computing system may receive from the target computing system data generate by the target computing system based on the replicated data. In some embodiments, one or more other source computing systems may also be configured to replicate one more types of data from the one or more other source computing systems to the target computing system. In some such embodiments, the target computing system may send data generated by the target computing system based on the replicated data to one or more of the source computing systems.

In some embodiments, the source computing system employs a technique for mapping fields of data managed by the source computing system to fields of data managed by the target computing system. In some such embodiments, data replicated from the source computing system to the target computing system based on the mapping. The mapping may be based on a preconfigured mapping between a subset of the fields of data managed by the source computing system and a corresponding subset of fields of data managed by the target computing system. A user of the source computing system may manually specify mappings between a field in the set of fields of data managed by the source computing system and a corresponding field in the set of fields of data managed by the target computing system.

In some embodiments, the target computing system is configured to receive data organized in a hierarchical manner. The source computing system, in some such embodiments, allows a user to specify a hierarchy for data objects based on attributes of the data objects. Data replicated from the source computing system to the target computing system may be organized based on the specified hierarchy. This way, the target computing system can receive and store the replicated data objects according to the hierarchy.

Also described herein are techniques for managing the data that may be replicated from the source computing system to the target computing system. For example, the source computing system may allow a user to create replication filters for filtering the data that may be replicated from the source computing system to the target computing system. In some embodiments, a replication filter may filter data based on attributes associated with the data and/or unique identifiers associated with the data. In some embodiments, a replication filter may specify a set of values for a set of attributes associated with data managed by the source computing system and/or a set of identifiers for identifying data managed by the source computing system. When data is replicated based on such a replication filter, data managed by the source computing system that has the values for the set of attributes specified in the replication filter and/or has an identifier specified in the replication filter are replicated from the source computing system to the target computing system. Data managed by the source computing system that do not match the criteria specified in the replication filter are not replicated.

In some embodiments, the source computing system utilizes a technique for transmitting data to computing systems. For example, the source computing system may be configured to transmit different types of data to a target computing system using any number of different communication protocols. The source computing system can also transmit data to different target computing systems using any number of different communication protocols. In addition, the source computing system may transmit data to a target computing system in different formats based on the type of the data. In some embodiments, the source computing system employs a logging feature that manages a log of data transmitted to other computing systems.

As mentioned above, the source computing system may receive from the target computing system data generated by the target computing system based on data replicated from the source computing system to the target computing system. In some embodiments, the source computing system employs a technique for processing the data received from the target computing system. For instance, the data that the source computing system receives from the target computing system may include expense reports. Each expense report may include one or more expense entries. In some such instances, the source computing system may determine an entry use case and a tax use case associated with for each expense entry. The source computing system may also determine a report use case based on the expense report.

Expense entries are processed differently based on the entry use case and/or tax use case associated with the expense entries. The expense entries are collectively processed according to the report use case. The source computing system may generate a document based on the processed expense entries.

I. Architecture

FIG. 1 illustrates a system 100 for integrating computing systems according to some embodiments. As shown, system 100 includes computing system 105, network 115, and computing systems 120a-n. Network 115 may be any type of network such as local area network (LAN), a wide area network (WAN), a metropolitan area network (MAN), an intranet, a network of networks, the Internet, etc., or a combination thereof.

Computing system 105 can be configured to integrate with one or more computing systems 120a-n. For example, computing system 105 may receive data from one or more computing systems 120a-n. When computing system 105 receives such data, computing system 105 stores the data in database(s) 115. In some embodiments, the data that computing system 105 receives from a computing system 120 includes master data (also referred to as master data objects). In some such embodiments, the master data may include any number of different types of master data (e.g., employee master data, cost center master data, vendor master data, purchase order master data, sales order master data, financial master data, etc.).

Computing system 105 may receive notifications from a computing system 120 indicating a change to data that computing system 105 received from the computing system 120. In cases where the change is a deletion of the data, computing system 105 deletes the corresponding data from database 110. In cases where the change is modification of the data, computing system 105 updates the data stored in database 110 with the updated data received from the computing system 120.

Computing system 105 can generate data based on the data received from computing systems 120a-n. For example, computing system 105 may generate expense reports, invoices, etc. based on the data received from computing systems 120a-n. One of ordinary skill in the art will appreciate that computing system 105 can generate additional and/or different types of data based on the data received from computing systems 120a-n. Computing system 105 may store such generated data in database(s) 110. Computing system 105 may send the generated data to one or more computing systems 120a-n for these computing systems 120a-n to process the data. In some embodiments, computing system 105 is implemented on a cloud computing system. In some such embodiments, computing system 105 is a travel management system that provides travel and/or expense management services to users of computing system 105.

Each computing systems 120 may be configured to integrate with computing system 105. For example, each computing system 120 can be configured to replicate data stored in database 130 to computing system 105. Each computing system 120 may receive from computing system 105 data generated by computing system 105 based on data replicated from one or more computing systems 120a-n to computing system 105. In some embodiments, a computing system 120 may be an enterprise resource planning (ERP) system that is configured to collect, store, manage, analyze, and/or interpret data from business-related activities (e.g., product planning, manufacturing, marketing, sales, inventory management, shipping, payment, finance, etc.)

As shown, each computing system 120 includes an integration manager 125 and a database 130. Database 130 is configured to store data managed by computing system 120, data accessed by computing system 120, data generated by computing system 120, data received from computing system 105, or any other data used in and/or facilitates the operation of computing system 120. While FIG. 1 shows one database in each computing systems 120a-n, one of ordinary skill in the art will realize that each computing system 120 may include any number of additional databases.

Figure 2:
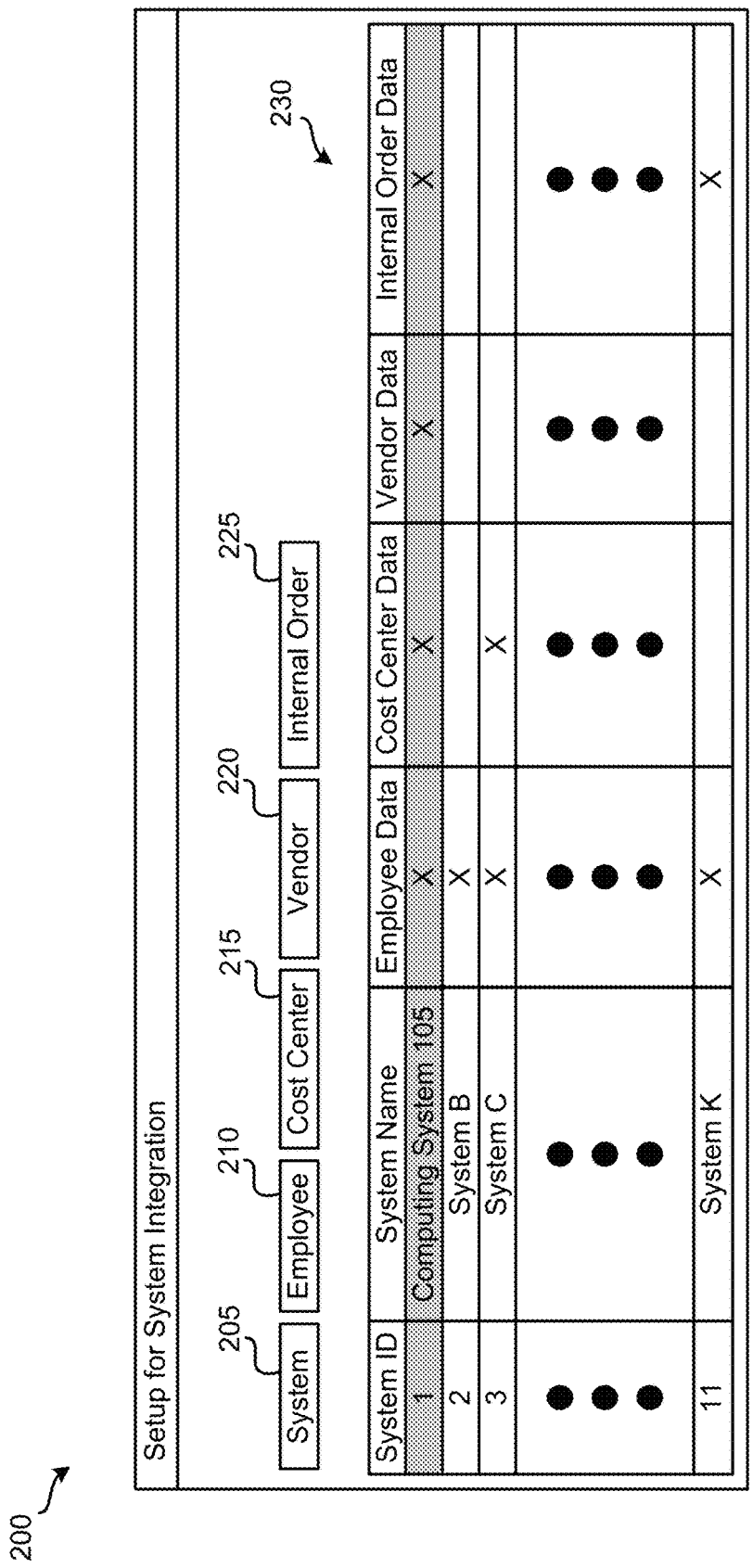
FIG. 2 illustrates a GUI for managing computing system integration according to some embodiments.

Integration manager 125 may facilitate the integration of computing system 120 with computing system 105. For instance, integration manager 125 can handle the replication of data stored in database 130 to computing system 105. Integration manager 125 also handles data received from computing system 105. In some embodiments, integration manager 125 provides a GUI for managing the integration of computing system 120 with computing system 105. FIG. 2 illustrates a GUI 200 for managing computing system integration according to some embodiments. As illustrated, GUI 200 includes selectable user interface (UI) items 205-225 and table 230. UI item 205, when selected, causes GUI 200 to provide a GUI for managing connections (e.g., creating connections, modifying connections, checking connections, monitoring connections, deleting connections, etc.) for computing systems with which computing system 120 integrates. Using this GUI to create a connection for a computing system causes a row for the computing system to be added to table 230. Using this GUI to delete a connection for a computing system causes the row corresponding to the computing system to be removed from table 230.

GUI 200 provides a selectable UI item for each type of data stored in database 130 that can be replicated to a computing system (e.g., computing system 105). In this example, database 130 stores employee data, cost center data, vendor data, and internal order data. As such, UI item 210, when selected, causes GUI 200 to provide a GUI for configuring the replication of employee data to the selected system in table 230 (computing system 105 in this example). UI item 215, when selected, causes GUI 200 to provide a GUI for configuring the replication of cost center data to the selected system in table 230. UI item 220, when selected, causes GUI 200 to provide a GUI for configuring the replication of vendor data to the selected system in table 230. UI item 225, when selected, causes GUI 200 to provide a GUI for configuring the replication of internal order data to the selected system in table 230. As such, a user can create a configuration for replicating a type of data to a particular computing system by selecting the computing system in table 230 and then selecting corresponding UI item from UI item 210-225.

Table 230 includes a system ID column, a system name column, and columns for each type of data stored in database 130 that can be replicated to a computing system. For this example, those columns include an employee data column, a cost center data column, a vendor data column, and an internal order data column. Each row in table 230 represents a computing system for integrating with computing system 120. In this example, such computing systems include computing system 105, and systems B-K (not shown in FIG. 1). As described above, computing systems are added to and removed from table 230 via UI item 205. In some embodiments, GUI 200 may provide options (e.g., selectable UI items, drop-down menu options, pop-up menu options, etc.) for adding, modifying, and deleting computing systems for integrating with computing system 120. For each row in table 230, the system ID column includes a unique identifier for a computing system with which computing system 120 is configured to integrate, the system name column includes a name of the computing system, and the columns for each type of data stored in database 130 that can be replicated to the computing system include an indicator (e.g., an "X" in this example) indicating that a configuration has been created for replicating the corresponding type of data to the computing system.

Figure 3:
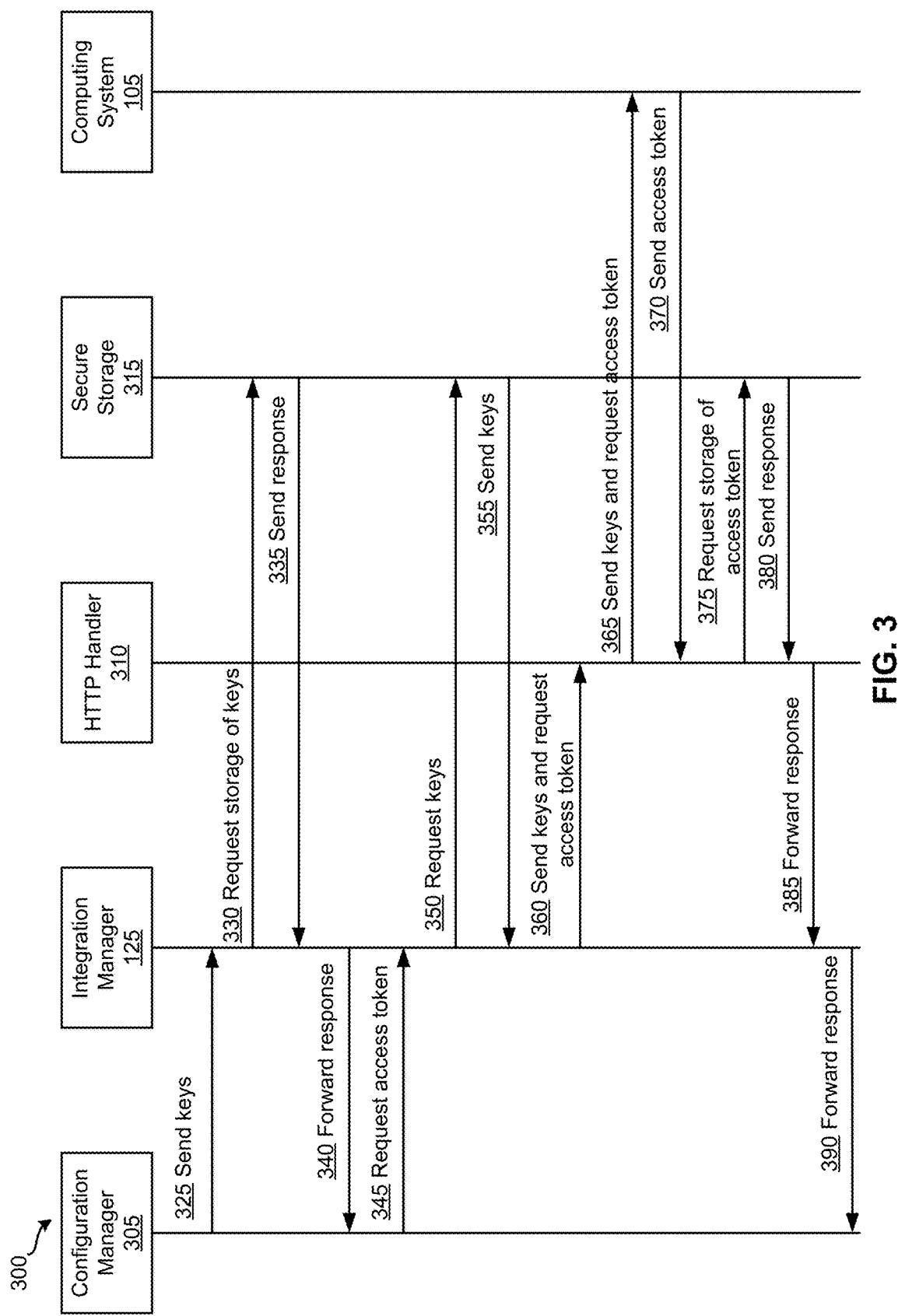
FIG. 3 illustrates a data flow for obtaining an access token according to some embodiments.

As mentioned above, selecting UI item 205 causes GUI 200 to provide a GUI for managing connections for computing systems with which computing system 120 integrates. Through this GUI, a user may create and configure a connection for communicating with a computing system. For example, the user may specify connection information for establishing a connection to the computing system. The user may also provide information for obtaining an access token that is used to access the computing system. FIG. 3 illustrates a data flow 300 for obtaining an access token according to some embodiments. For example, integration manager 125 passes the access token to computing system 105 when replicating data to computing system 105. In some embodiments, the access token is for accessing computing system 105 via a set of application programming interface (APIs) provided by computing system 105.

As shown, data flow 300 includes configuration manager 305, integration manager 125, hypertext transfer protocol (HTTP) handler 310, secure storage 315, and computing system 105. For this example, configuration manager 305, HTTP handler 310, and secure storage 315 are part of the computing system 120 on which integration manager 125 is operating. In some embodiments, configuration manager 305 and/or HTTP handler 310 may be part of integration manager 125. Secure storage 315 may be part of the database 130 included in the computing system 120 on which integration manager 125 is operating.

Data flow 300 starts by configuration manager 305 sending, at 325, integration manager 125 keys associated the computing system 120 on which integration manager 125 operates. The keys that configuration manager 305 sends may be provided from a user through the GUI provided by integration manager 125 for managing connections, as described above. In some embodiments, the keys can include a unique identifier associated with the computing system 120 on which integration manager 125 operates and a unique value associated with the computing system 120. Next, integration manager 125 sends secure storage 315 the keys and requests, at 330, secure storage 315 to store the keys. When secure storage 315 receives the keys, secure storage 315 stores the keys in a secure manner and then sends, at 335, integration manager 125 a response indicating that the keys are successfully stored. Integration manager 125 forwards, at 340, the response to configuration manager 305.

Configuration manager 305 then sends, at 345, integration manager 125 a request for an access token for accessing computing system 105. In response to the request, integration manager 125 sends, at 350, secure storage 315 a request for the keys. When secure storage 315 receives this request, secure storage 315 identifies the keys and sends, at 355, integration manager 1253 the requested keys. Next, integration manager 125 sends, at 360, HTTP handler 310 the keys and requests for the access token for accessing computing system 105. In response, HTTP handler 310 sends, at 365, computing system 105 the keys and requests for the access token for accessing computing system 105. In some embodiments, HTTP handler 310 sends computing system 105 the keys and request using an HTTP communication protocol.

When computing system 105 receives the keys and request, computing system 105 generates an access token that allows the computing system 105 on which integration manager 125 is operating to access computing system 105. The access token may expire after a defined amount of time (e.g., an hour, a day, a week, etc.). Thus, computing system 105 may also generate a refresh token that integration manager 125 can use to refresh the access token. Computing system 105 then sends, at 370, HTTP handler 310 the access token and the refresh token. In some embodiments, computing system 105 sends HTTP handler 310 the access token and refresh token using an HTTP communication protocol. When HTTP handler 310 receives the access token and the refresh token, HTTP handler 310 sends, at 315, secure storage 315 the access token and refresh token and then requests secure storage 315 to store the access token and the refresh token. In instances where computing system 105 sends HTTP handler 310 the access token and refresh token using the HTTP communication protocol, HTTP handler 310 processes the data received from computing system 105 and identifies the access token and the refresh token in the received data. In response, secure storage 315 stores the access token and refresh token in a secure manner and sends, at 315, HTTP handler 310 a response indicating that the access token and refresh token are successfully stored. HTTP handler 310 then forwards, at 385, the response to integration 125, which in turn forwards, at 390, the response to configuration manager 305. In some embodiments, configuration manager 305 displays the response in GUI 200 when configuration manager 305 receives the response.

Returning to FIG. 1, a user may specify, through the GUI (e.g., GUI 200) provided by integration manager 125 for managing the computing system integration, a configuration for each type of data to be replicated to computing system 105. In some embodiments, a configuration for a type of data may include an identifier that is used to uniquely identify data objects stored in database 130 having the type. For instance, a person ID field in database 130 may be used to uniquely identify employee data objects in database 130. A user may specify this person ID field as the identifier when specifying a configuration for the employee data type to be replicated to computing system 105.

Integration manager 125 may also manage data replication based on the configurations for the various types of data. Once a user has finished creating a configuration for a type of data, integration manager 125 replicates data objects stored in database 130 having the type from computing system 120 to computing system 105 based on the connection specified for computing system 105 as well as the configuration for the type of data. In some embodiments, integration manager 125 passes the access token obtained in the manner described above by reference to FIG. 3 along with the data objects replicated to computing system 105. Integration manager 125 can handle changes to data objects stored in database 130 that has been replicated to computing system 105. For example, when a change occurs to data in database 130 that has been replicated to computing system 105, integration manager 125 sends computing system 105 a notification of such change. When a new data object having a type that is configured for replication to computing system 105 is added to database 130, integration manager 125 replicates the new data object to computing system 105.

Integration manager 125 may receive from computing system 105 data generated by computing system 105 based on data replicated from computing system 120 and/or one or more other computing systems 120a-n to computing system 105. Integration manager 125 stores such data in database 130. In some embodiments, integration manager 125 may process the data that integration manager 125 receives from computing system 105.

The description above by reference to FIG. 1 shows an example of integrating computing systems 120a-n with computing system 105. One of ordinary skill in the art will appreciate that system 100 may include any number of additional computing systems similar to computing system 105 and computing systems 120a-n may integrate with those additional computing systems in the same and/or similar manner described above. In addition, FIG. 1 illustrates database 110 as part of computing system 105 and databases 130a-n as part of computing system 120a-n. One of ordinary skill in art will understand that database 110 and/or one or more databases 130a-n may be external to the respective computing system in some embodiments.

Figure 4:
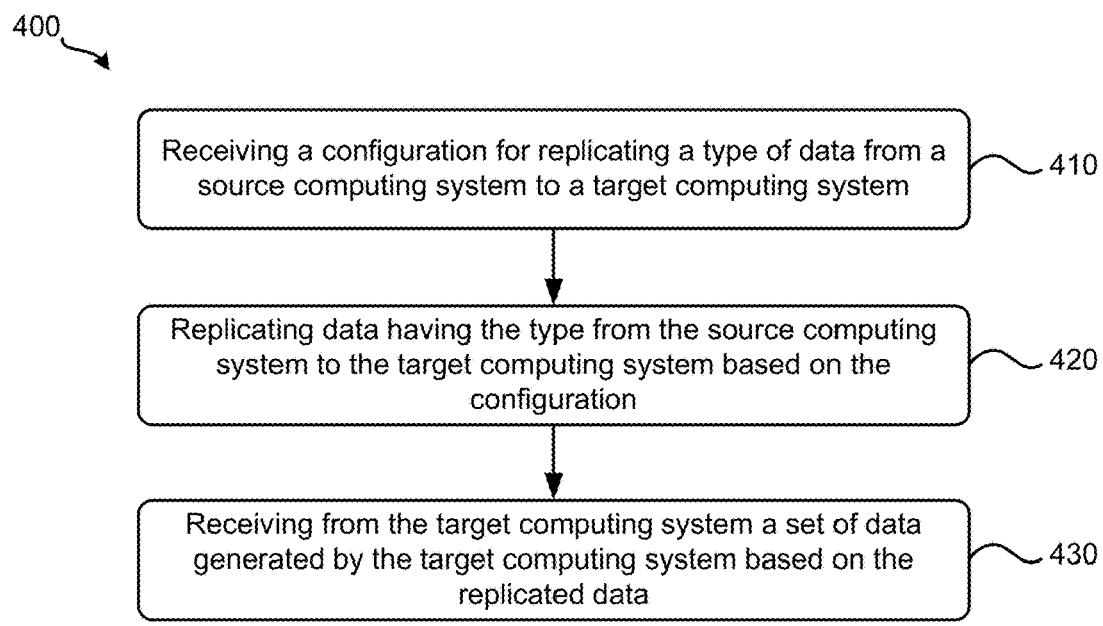
FIG. 4 illustrates a process for replicating data according to some embodiments.

FIG. 4 illustrates a process 400 for replicating data according to some embodiments. In some embodiments, integration manager 125 in each computing system 120 performs process 400. Process 400 starts by receiving, at 410, a configuration for replication a type of data from a source computing system to a target computing system. Referring to FIG. 1 as an example, a computing system 120 may be the source computing system and computing system 105 may be the target computing system. In some embodiments, the configuration may be specified by a user via a GUI (e.g., GUI 200) provided by integration manager 125.

Next, process 400 replicates, at 420, data having the type from the source computing system to the target computing system based on the configuration. In some embodiments, process 400 replicates the data by establishing a connection to the target computing system based on the connection specified for the target computing system and passing the access token obtained in the manner described above by reference to FIG. 3 along with the data replicated to the target computing system.

Finally, process 400 receives, at 430, from the target computing system a set of data generated by the target computing system based on the replicated data. Since each integration manager 125 may be configured to perform process 400, one or more source computing systems (e.g., computing systems 120a-n) may replicate data to the target computing system (e.g., computing system 105). In some embodiments, the set of data generated by the target computing system may be based on replicated data that the target computing system receives from the source computing system and one or more other source computing systems. In other embodiments, the set of data generated by the target computing system may be based on replicated data that the target computing system receives from one or more other source computing systems.

II. Field Mapping

As explained above by reference to FIG. 1, a user may specify, through a GUI (e.g., GUI 200) provided by integration manager 125, a configuration for a type of data to be replicated to computing system 105. When a user is specifying a configuration for a type of data, integration manager 125 may provide a mapping between fields of data stored in database 130 and fields of data stored in database 110.

Figure 5:
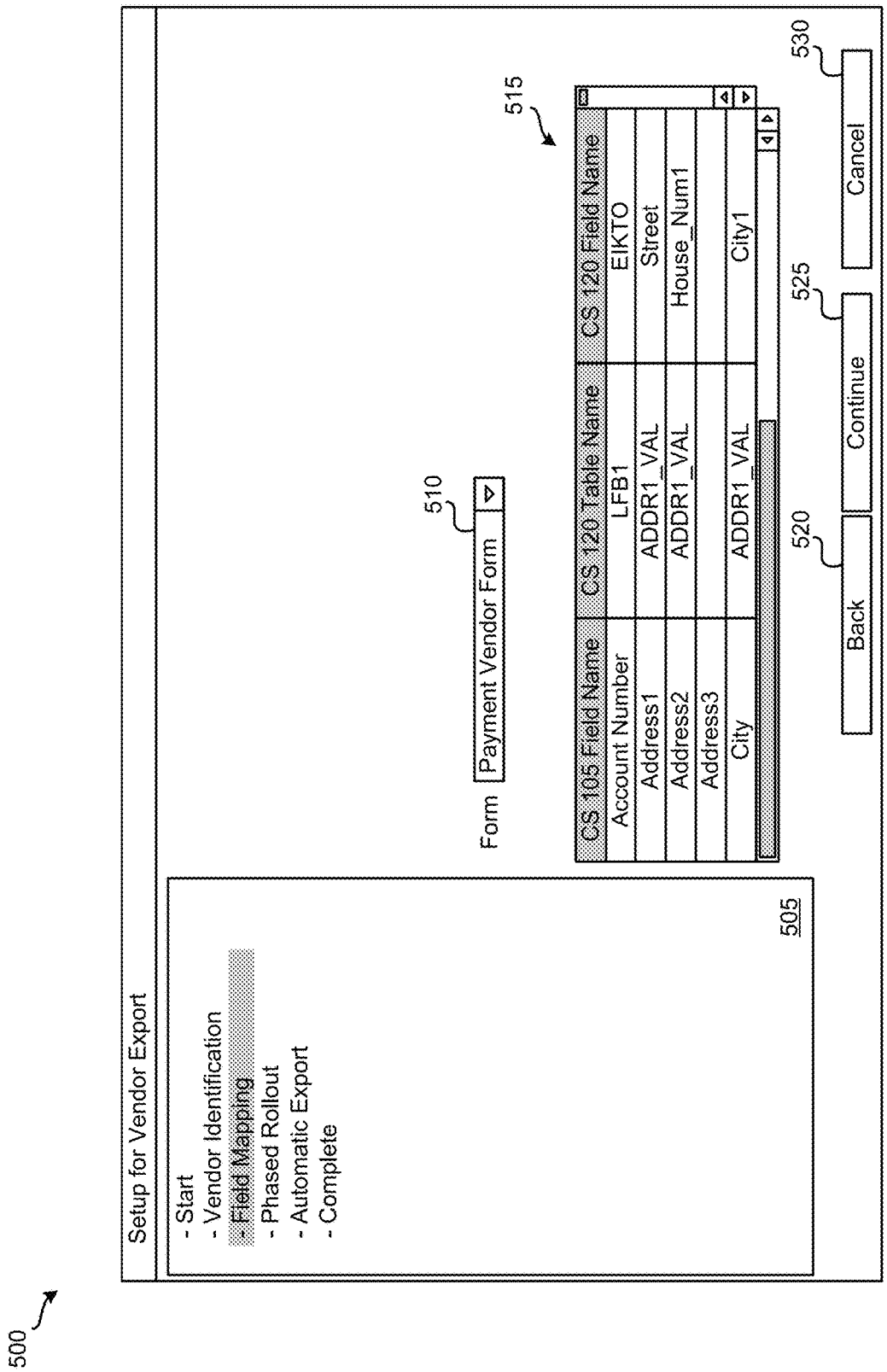
FIG. 5 illustrates a GUI for mapping fields according to some embodiments.

FIG. 5 illustrates a GUI 500 for mapping fields according to some embodiments. Specifically, GUI 500 is for mapping fields for a vendor data type. In some embodiments, integration manager 125 displays GUI 500 as one of the GUIs provided in a process for specifying a configuration for replicating vendor data stored in database 130 that was initiated via a selection of UI item 220 shown in FIG. 2. As shown, GUI 500 includes display area 505, UI control 510, preview display area 515, and selectable UI items 520-530. Display area 505 is configured to display the stages in the configuration process for a type of data. In this example, display area 505 is displaying the stages in the configuration process for a vendor data type. Additionally, display area 505 is highlighting the "Field Mapping" stage to indicate the current stage of the configuration process.

UI control 510 is configured to display a drop-down list upon selection of UI control 510. The drop-down list may include forms associated with the type of data (forms associated with a vendor data type in this example). In some embodiments, computing system 105 stores and manages forms associated with different types of data that can be stored in database 110. When integration manager 125 provides GUI 500, integration manager sends computing system 105 a request for forms associated with the type of data for which a configuration is being specified. Integration manager 125 populates the drop-down list with the forms received from computing system 105.

In some embodiments, a form is associated with a set of fields of data stored in the database 110 having the type of data associated with the form. When GUI 500 receives a selection of a form from the drop-down list, integration manager 125 sends computing system 105 a request for the set of fields associated with the selected form. A mapping between one or more fields associated with a form and a corresponding one or more fields of data (e.g., one or more columns of one or more tables) stored in database 130 may be preconfigured.

Preview display area 515 is configured to display a preview of the mappings between fields associated with the selected form and fields of data stored in database 130. Thus, when integration manager 125 receives the set of fields associated with the selected form from computing system 105, integration manager 125 displays in preview display area 515 mappings between fields associated with the form and fields of data stored in database 130 based on the preconfigured mapping. As shown in FIG. 5, preview display area 515 displays a preview of mappings between fields associated with a payment vendor form and fields of data stored in database 130 based on an example preconfigured mapping. Specifically, a Computing System (CS) 105 Field Name column displays a name of a field associated with a payment vendor form, a CS 120 Table Name column displays a name of a table in which a field of data stored in database 130 is mapped to the field associated with the payment vendor form, and a CS 120 Field Name column displays a name of the field of data in the table that is mapped to the field associated with the payment vendor form.

UI item 520, when selected, causes integration manager 125 to display a GUI associated with a previous stage (a vendor identification phase in this example) of the configuration process. UI item 525, when selected, causes integration manager 125 to display a GUI associated with a next step in the field mapping stage of the configuration process. UI item 530, when selected, causes integration manager 125 to cancel the configuration process and navigate to GUI 200.

FIG. 6 illustrates a GUI 600 for specifying field mappings according to some embodiments. In particular, GUI 600 is provided by integration manager 125 upon selection of UI item 525 in FIG. 5. In other embodiments, GUI 600 is provided by integration manager 125 upon selection of a UI item in a submenu that is provided upon selection of UI item 220. As shown, GUI 600 includes table 605. Table 605 displays the mappings between fields associated with a payment vendor form and fields of data stored in database 130 based on the example preconfigured mapping that was previewed in preview display area 515 in FIG. 5. Table 605 includes the columns shown in preview display area 515 except table 605 also includes a Form Type column that displays a name of the form with which the field in the CS 105 Field Name column is associated and a CS 105 Field ID column that displays an identifier of the field associated with form.

A user may manually specify mappings between fields associated with the form and fields of data stored in database 130 via table 605. For example, the user may specify a mapping between the ContactFirstName field associated with the payment vendor form and a field of data stored in database 130 by selecting the corresponding row in the CS 120 Table Name column and entering the name of the table in which the field of data is stored in database 130 and selecting the corresponding row in the CS 120 Field Name column and entering the name of the field in the table. The user may perform similar operations to specify a mapping for the Custom1 field associated with the payment vendor form. In some embodiments, the user may modify one or more mappings specified based on the preconfigured mapping. In other embodiments, GUI 600 does not allow the user to modify any of the mappings specified based on the preconfigure mapping.

In some embodiments, a use may specify a mapping between a field associated with the form and several fields of data stored in database 130. For instance, the user may select a processing code definition that specifies a field associated with the form and one or more fields of data stored in database 130. In some cases, a processing code definition also specifies a set of operations to perform on the values of the one or more fields of data stored in database 130 to calculate and/or derive a value for the field associated with the form. For example, a processing code definition may specify an address field associated with a form and a street number, street name, city, state, and zip fields of data stored in database 130 and an operation to combine the values of the street number, the street name, the city, the state, and the zip fields to generate the value for the address field associated with the form. In some embodiments, the set of operations of a processing code definition for a mapping is performed when data is replicated from a computing system 120 to computing system 105. As shown in FIG. 6, processing code definitions have been selected for the first, second, third, fifth, and eighth mappings in table 605.

In addition, a user may also select a conversion code definition for a mapping between a field associated with the form and a field of data stored in database 130. In some embodiments, a conversion code definition specifies a set of operations for converting the format of a field of data stored in database 130 to a different format for a field associated with the form. For example, a conversion code may specify a set of operations for converting a United States Dollar (USD) currency format of a field of data stored in database 130 to a Canadian Dollar (CAD) format for a field associated with the form. In some embodiments, the set of operations of a conversation code definition for a mapping is performed when data is replicated from a computing system 120 to computing system 105. One of ordinary skill in the art will understand that any number of different data format conversation may be defined. As illustrated in FIG. 6, conversion code definitions have been selected for the first and tenth mappings in table 605.

A user may also select a code mapping definition for a mapping between a field associated with the form and a field of data stored in database 130. In some embodiments, a code mapping definition specifies a first set of values and a second set of values. Each value in the first set of values is mapped to a value in the second set of values. For a mapping between a field associated with the form and a field of data stored in database 130 that has a selected code mapping definition, a value for the field of data stored in database 130 is converted to another value based on the code mapping definition when data is replicated from a computing system 120 to computing system 105. Specifically, the value for the field of data stored in database 130 is identified in the first set of values. The value for the field of data stored in database 130 is then converted to the value in the second set of values to which the identified value in the first set of values is mapped. As shown in FIG. 6, code mapping definitions have been selected for the first, second, sixth, and tenth mappings in table 605.

Figure 7:
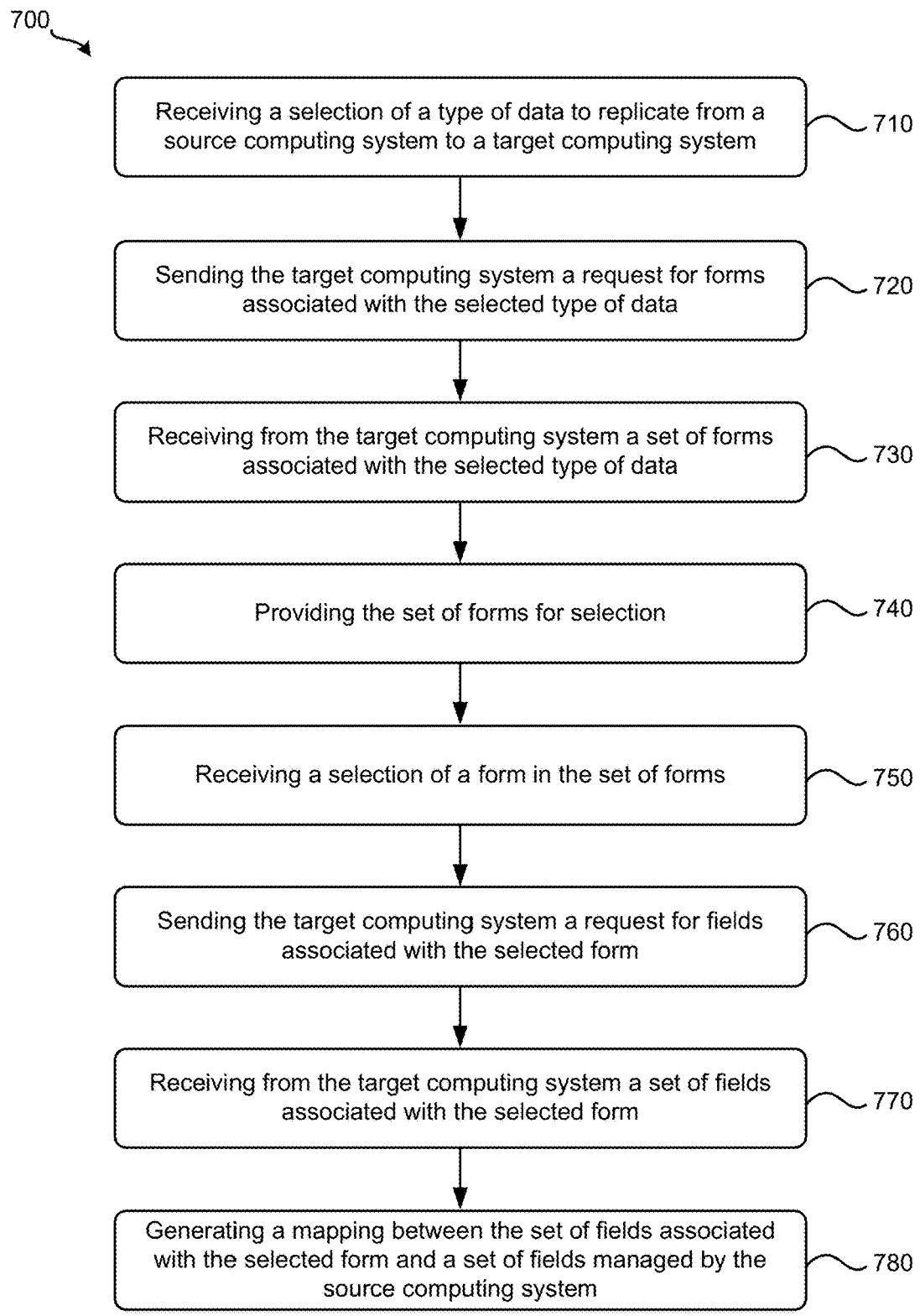
FIG. 7 illustrates a process for mapping fields according to some embodiments.

FIG. 7 illustrates a process 700 for mapping fields according to some embodiments. In some embodiments, integration manager 125 performs process 700. Process 700 begins by receiving, at 710, a selection of a type of data to replicate from a source computing system to a target computing system. Referring to FIG. 1 as an example, a computing system 120 may be the source computing system and computing system 105 may be the target computing system. In some embodiments, the selection of the type of data may be a selection by a user of a UI item (e.g., one of the UI items 210-225) to initiate the process for specifying a configuration for replicating the type of data stored in database 130.

Next, process 700 sends, at 720, the target computing system a request for forms associated with the selected type of data. As mentioned above, computing system 105 may store and manage forms associated with different types of data that can be stored in database 110. Process 700 then receives, at 730, from the target computing system a set of forms associated with the selected type of data. Next, process 700 provides, at 740, the set of forms for selection. Referring to FIG. 5 as an example, process 700 may provide the set of forms by populating the drop-down list that UI control 510 displays, upon selection of UI control 510, with the set of forms.

After receiving the set of forms, process 700 receives, at 750, a selection of a form in the set of forms. Referring to FIG. 5 as an example, process 700 may receive a selection of a form in the drop-down list that UI control 510 displays upon selection of UI control 510. Next, process 700 sends, at 760, the target computing system a request for fields associated with the selected form. As described above, a form is associated with a type of data as well as a set of fields of data stored in the database 110 having the type of data. Process 700 then receives, at 770, from the target computing system a set of fields associated with the selected form. Finally, process 700 generates, at 780, a mapping between the set of fields associated with the selected form and a set of fields of data managed by the source computing system. In some embodiments, the set of fields of data managed by the source computing system includes fields of data stored in database 130. The mapping may be based on a preconfigured mapping and/or manually-specified mappings as described above by reference to FIGS. 5 and 6.

III. Data Hierarchies

In some embodiments, computing system 105 is configured to receive from computing systems 120*a-n* data organized in a hierarchical manner. As such, in some such embodiments, each integration manager 125 may allow a user to specify a hierarchy for data objects stored in database 130 based on attributes of the data objects. When data is replicated from computing systems 120*a-n* to computing system 105, the data is organized based on the specified hierarchy. This way, computing system 105 can receive and store the replicated data objects in a hierarchical manner.

Figure 8:
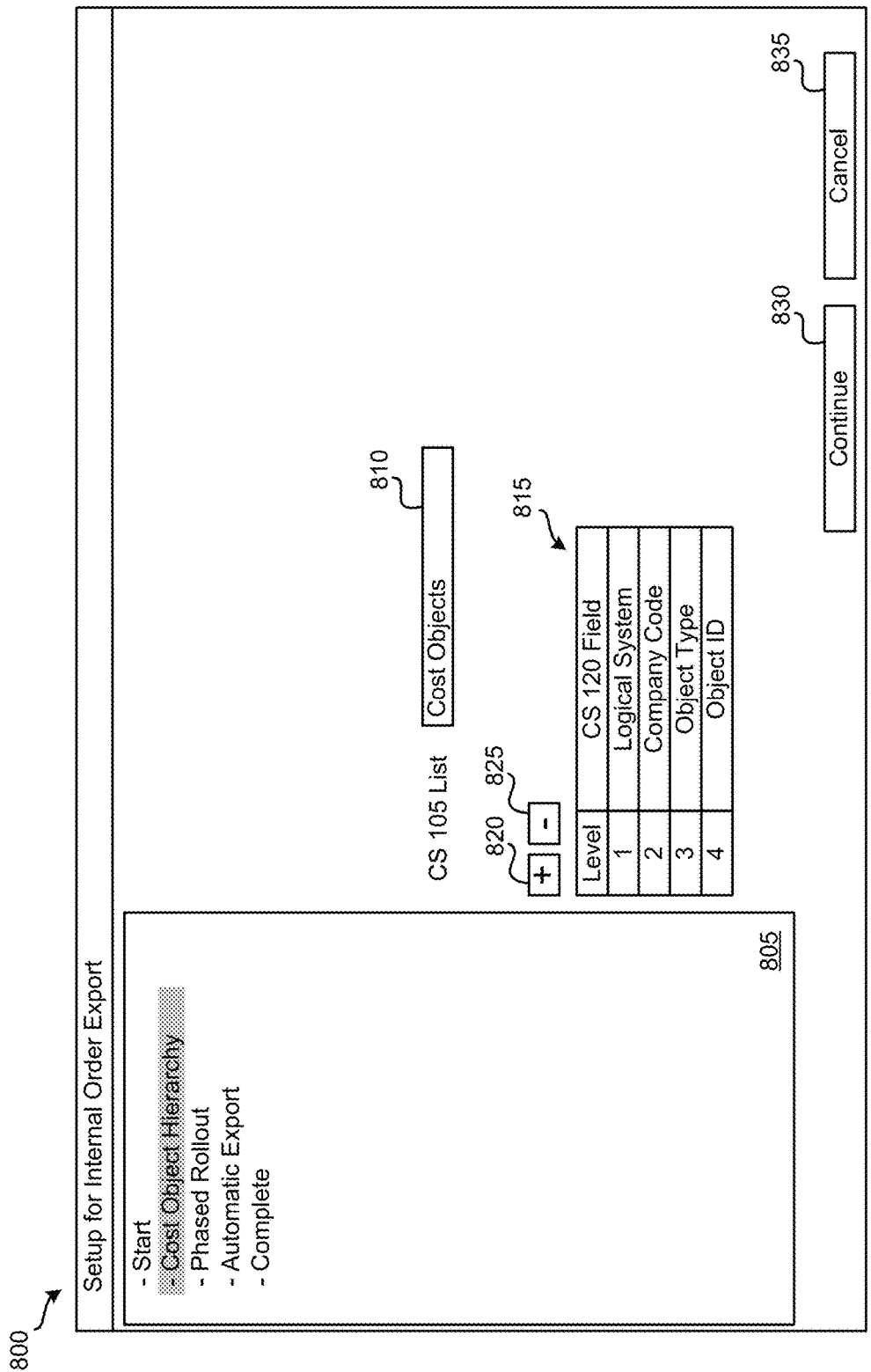
FIG. 8 illustrates a GUI for specifying a hierarchy for data objects according to some embodiments.

FIG. 8 illustrates a GUI 800 for specifying a hierarchy for data objects according to some embodiments. Specifically, GUI 800 is for specifying a hierarchy for cost objects. Cost objects may include a number of different types of cost objects such as, for example, cost center objects, internal order objects, network header objects, network activity objects, sales order item objects, etc. In some embodiments, integration manager 125 displays GUI 800 as one of the GUIs provided in a process for specifying a configuration for replicating internal order data stored in database 130 that was initiated via a selection of UI item 225 shown in FIG. 2. As illustrated, GUI 800 includes display area 805, UI control 810, table 815, and selectable UI items 820-835. Display area 805 is configured to display the stages in the configuration process for a type of data. In this example, display area 805 is displaying the stages in the configuration process for an internal order data type. In addition, display area 805 is highlighting the "Cost Object Hierarchy" stage to indicate the current stage of the configuration process.

UI control 810 is configured to receive input specifying a hierarchical list of attributes defined in computing system 105. For this example, the specified hierarchical list of attributes that has been defined in computing system 105 is a "Cost Objects" hierarchical list. Table 815 includes attributes associated with data objects (cost objects in this example) and corresponding levels of the attributes in a hierarchy. Since computing system 105 is configured to receive data objects according to a hierarchical list of attributes defined in computing system 105, data objects replicated from computing system 120 to computing system 105 are organized according to the hierarchical list of attributes. Accordingly, a user may specify a hierarchy of attributes used for replicating data such that it mirrors the hierarchical list of attributes defined in computing system 105. In this example, the hierarchical list of attributes defined in computing system 105 specifies a hierarchy that includes a logical system attribute at a first, top level of the hierarchy, a company code attribute at a second level of the hierarchy, an object type attribute at a third level of the hierarchy, and an object id attribute at a fourth, bottom level of the hierarchy. Thus, the user in this example has specified a hierarchy of attributes associated with cost objects that mirrors the hierarchical list of attributes defined in computing system 105. As shown in FIG. 8, a logical system attribute associated with cost objects is specified at level 1, a company code attribute associated with cost objects is specified at level 2, an object type attribute associated with cost objects is specified at level 3, and an object id attribute associated with cost objects is specified at level 4.

UI item 820, when selected, causes integration manager 125 to provide an option to select and add an attribute associated with a data object to the hierarchy. When the attribute is added to the hierarchy, integration manager 125 adds the attribute to table 815. UI item 825, when selected, causes integration manager 125 to remove a selected attribute from the hierarchy and from the table 815. 830, when selected, causes integration manager 125 to generate a hierarchical list based on the hierarchy of attributes displayed in table 815 and then display a GUI associated with a next stage in the configuration process for the internal order data type. In some embodiments, integration manage 125 stores the generated hierarchical list in a table in database 130. UI item 835, when selected, causes integration manager 125 to cancel the configuration process and navigate to GUI 200. As described above, GUI 800 allows a user to specify a hierarchy (e.g., using UI control 810, UI item 820, and UI item 825) that has been defined in computing system 105. In some embodiments, integration manager 125 may request the hierarchy list of the hierarchy from computing system 105. In return, integration manager 125 may receive the hierarchy list from computing system 105 and store it in a table in database 130.

Figure 9:
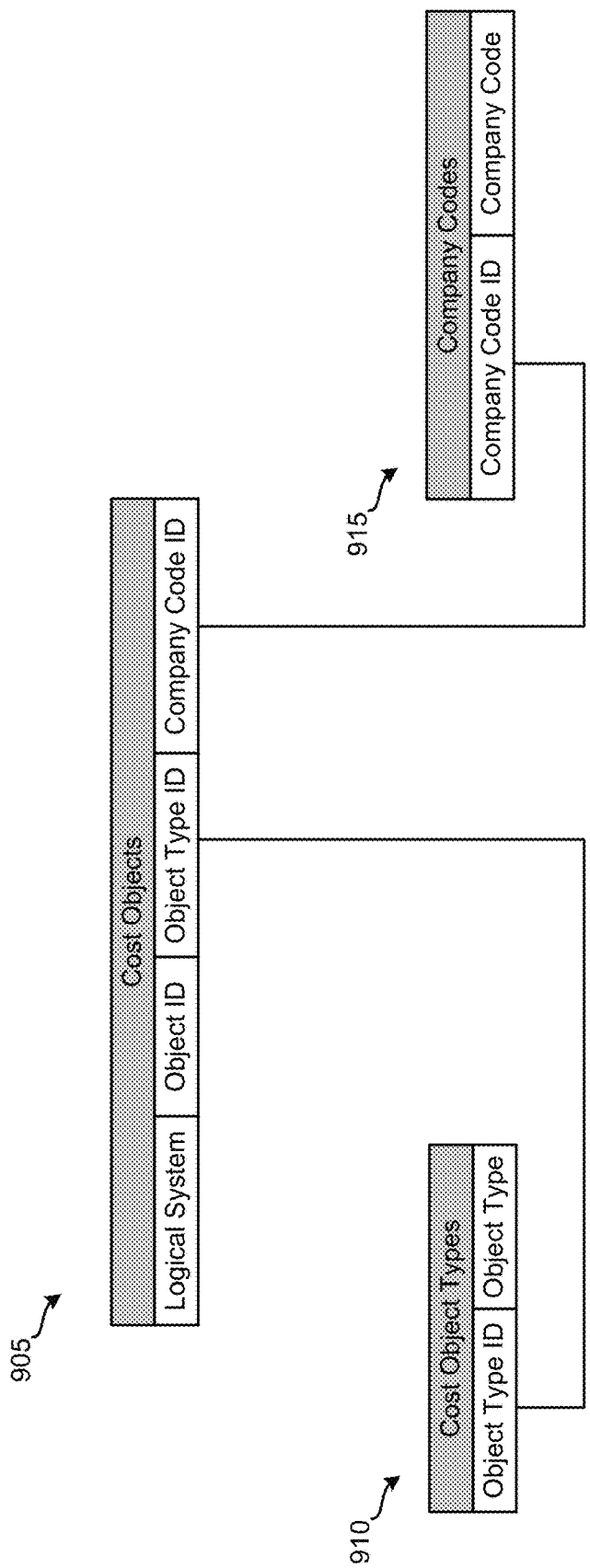
FIG. 9 illustrates relationships between attributes associated with data objects according to some embodiments.

In some embodiments, the attributes associated with data objects stored in database 130 are stored in several different tables in database 130. In order to replicate a data object from computing system 120 to computing system 105 according to a specified hierarchy of attributes, integration manager 125 retrieves the attributes specified in the hierarchy from the tables in which the attributes are stored. FIG. 9 illustrates relationships between attributes associated with data objects according to some embodiments. In particular, FIG. 9 shows the relationships between attributes associated with cost objects that are stored in three tables 905, 910, and 915. As illustrated, table 905 stores data for cost objects that includes a logical system associated with a cost object, an object ID for identifying the cost object, an object type ID for referencing an object type stored in table 910, and a company code ID for referencing a company code stored in table 915. Table 910 stores data for cost object types that includes an object type ID for uniquely identifying an object type and the object type itself. Table 915 stores data for company codes that includes a company code ID for uniquely identifying a company code and the company code itself. In order for integration manager 125 to replicate a cost object stored in database 130 in the manner shown to FIG. 9 according to the hierarchy of attributes shown in table 815, integration manager 125 retrieves the logical system associated with the cost object and the object ID of the cost object from table 905, retrieves the object type of the cost object from table 910 based on the object type ID of the cost object in table 905, and retrieves the company code of the cost object from table 915 based on the company code ID of the cost object in table 905. FIGS. 8 and 9 illustrate an example of specify a hierarchy for one type of data object stored in database 130. One of ordinary skill in the art will appreciate that the same or similar techniques may be used for specifying a hierarchy for any number of other types of data objects stored in database 130.

Figure 10:
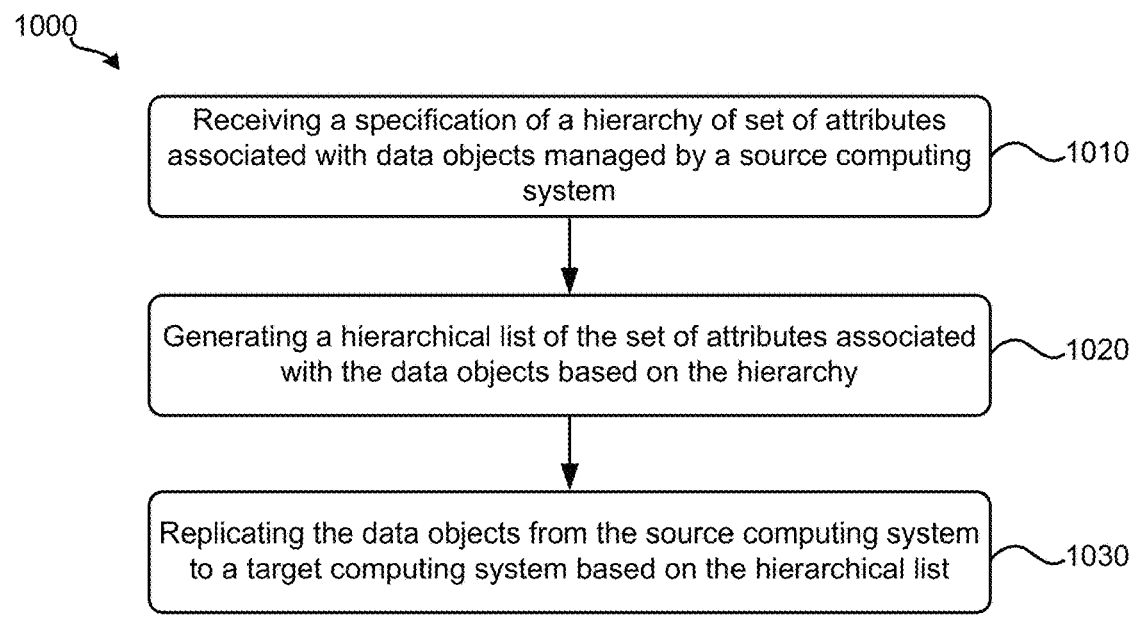
FIG. 10 illustrates a process for replicating data objects in a hierarchical manner according to some embodiments.

FIG. 10 illustrates a process 1000 for replicating data objects in a hierarchical manner according to some embodiments. In some embodiments, integration manager 125 performs process 1000. Process 1000 starts by receiving, at 1010, a specification of a hierarchy of a set of attributes associated with data objects managed by source computing system. Referring to FIG. 1 as an example, a computing system 120 may be the source computing system. In some embodiments, the hierarchy of the set of attributes associated with data objects is specified via GUI 800 in the manner explained above by reference to FIG. 8.

Next, process 1000 generates, at 1020, a hierarchical list of the set of attributes associated with the data objects based on the hierarchy. In some embodiments, process 1000 performs operation 1020 in response to receiving a selection of UI item 830 via GUI 800. After generating the hierarchical list, stores the generated hierarchical list in a table in database 130 in some embodiments.

Finally, process 1000 replicates, at 1030, the data objects from the source computing system to the target computing system based on the hierarchical list. As described above, in some embodiments, the attributes associated with data objects stored in database 130 are stored in several different tables in database 130. Thus, process 1000 retrieves the attributes specified in the hierarchy from the tables in which the attributes are stored in some such embodiments. Referring to FIGS. 8 and 9 as an example, process 1000 replicate a cost object stored in database 130 in the manner shown to FIG. 9 based on the hierarchy of attributes shown in table 815 by retrieving the logical system associated with the cost object and the object ID of the cost object from table 905, retrieving the object type of the cost object from table 910 based on the object type ID of the cost object in table 905, and retrieving the company code of the cost object from table 915 based on the company code ID of the cost object in table 905.

Once process 1000 retrieves the attributes associated with the cost object that are specified in the hierarchical list, process 1000 sends the target computing system the value of each attribute in the hierarchical list along with the corresponding level of the attribute in the hierarchical list. Continuing with the above example, process 1000 sends the targeting computing system a value for the logical system attribute associated with the cost object along with a corresponding level of 1, a value for the company code attribute associated with the cost object along with a corresponding level of 2, a value for the object type associated with the cost object along with a corresponding level of 3, and a value for the object ID attribute associated with the cost object along with a corresponding level of 4.

IV. Replication Filtering

As explained above, each integration manager 125 may manage data replication based on configurations for various types of data. In some embodiments, integration manager 125 may allow a user to specify, for a configuration for a type of data, a replication filter for filtering the data that may be replicated. For instance, a user may specify, for a replication filter, a set of values for a set of attributes associated with data stored in database 130. When data is replicated based on such a replication filter, data stored in database 130 having the set of values for the set of attributes specified in the replication filter are replicated while other data stored in database 30 are not replicated. A user can specify, for a replication filter, a set of identifiers for identifying data in database 130. When data is replicated based on such a replication filter, data stored in database 130 associated with the set of identifiers specified in the replication filter are replicated while other data stored in database 30 are not replicated. A user may specify, for a replication filter, a combination of a set of values for a set of attributes associated with data stored in database 130 and a set of identifiers for identifying data objects in database 130.

Figure 11:
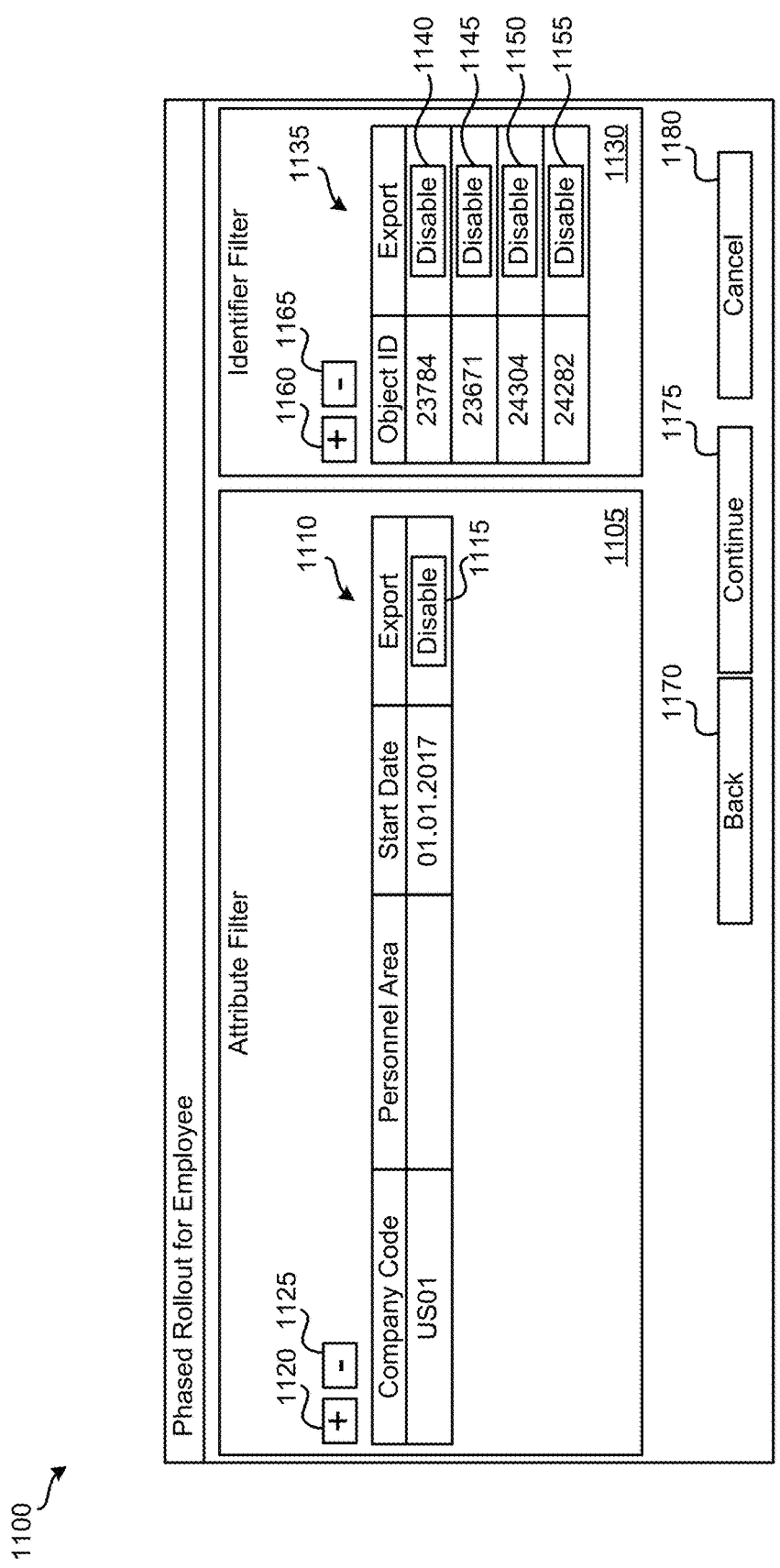
FIG. 11 illustrates a GUI for specifying a replication filter according to some embodiments.

FIG. 11 illustrates a GUI 1100 for specifying a replication filter according to some embodiments. In particular, GUI 1100 is for specifying a replication filter for an employee data type. In some embodiments, integration manager 125 displays GUI 1100 as one of the GUIs provided in a process for specifying a configuration for replicating employee data stored in database 130 that was initiated via a selection of UI item 210 shown in FIG. 2.

As shown, GUI 1100 includes display area 1105, display area 1130, and selectable UI items 1170-1180. Display area 1105 is for managing attribute filters for a replication filter. Display area 1105 includes table 1110 and selectable UI items 1120 and 1125. Table 1110 displays attribute filters for the replication filter. As shown in table 1110, an attribute filter includes one or more attributes, a start date, and a selectable UI item for enabling/disabling the attribute filter. When adding an attribute filter, a user may select one or more attributes associated with the type of data (an employee data type in this example) and specify one or more values for at least one of the selected attributes. The user may also specify a date for the start date field that represent the date on which the attribute filter is to be applied. Once the user has added the attribute filter to the replication filter, integration manager 125 displays the attribute filter in table 1110 along with a selectable UI item for enabling/disabling the attribute filter. The user may enable or disable the attribute filter by selecting the UI item. In this example, a user has added and enabled (by selecting UI item 1115) an attributed filter that filters for employee data having a value of "US01" for a Company Code attribute. The attribute filter is specified to be applied on and after Jan. 1, 2017.

UI item 1120, when selected, causes integration manager 125 to provide an option to specify values for an attribute filter and add the attribute filter to the replication filter. When the attribute filter is added to the replication filter, integration manager 125 adds the attribute filter to table 1110. UI item 1125, when selected, causes integration manager 125 to remove a selected attribute filter from the replication filter and from table 1110.

Display area 1130 is for managing identifier filters for the replication filter. Display area 1130 includes table 1135 and selectable UI items 1160 and 1165. Table 1135 displays identifier filters for the replication filter. As illustrated in table 1135, an identifier filter includes an identifier and a selectable UI item for enabling/disabling the identifier filter. When adding an identifier filter, a user may specify a value for an identifier. In some embodiments, data may have several identifiers. In some such embodiments, the user may select the identifier and then specify a value for the selected identifier. Once the user has added the identifier filter to the replication filter, integration manager 125 displays the identifier filter in table 1135 along with a selectable UI item for enabling/disabling the identifier filter. The user may enable or disable the attribute filter by selecting the UI item. In this example, a user has added and enabled (by selecting UI item 1140) an identifier filter that filters for an employee data object having a value of "23784" for an Object ID identifier, added and enabled (by selecting UI item 1144) an identifier filter that filters for an employee data object having a value of "23671" for an Object ID identifier, added and enabled (by selecting UI item 1150) an identifier filter that filters for an employee data object having a value of "24304" for an Object ID identifier, and added and enabled (by selecting UI item 1155) an identifier filter that filters for an employee data item having a value of "23784" for an Object ID identifier.

UI item 1160, when selected, causes integration manager 125 to provide an option to specify a value for an identifier filter and add the identifier filter to the replication filter. When the identifier filter is added to the replication filter, integration manager 125 adds the identifier filter to table 1135. UI item 1165, when selected, causes integration manager 125 to remove a selected identifier filter from the replication filter and from table 1135. In some embodiments, an identifier associated with data may not be a unique identifier. Thus, integration manager 125 may, in some such embodiments, allow a user to specify one or more values for one or more attributes associated with the data when specifying an identifier filter.

UI item 1170, when selected, causes integration manager 125 to display a GUI associated with a previous stage of the configuration process. UI item 1175, when selected, causes integration manager 125 to generate a replication filter based on the specified attribute filters and/or identifier filters displayed in tables 1110 and 1135. Integration manager 125 then displays a GUI associated with a next stage in the configuration process for the internal order data type. UI item 1180, when selected, causes integration manager 125 to cancel the configuration process and navigate to GUI 200.

Figure 12:
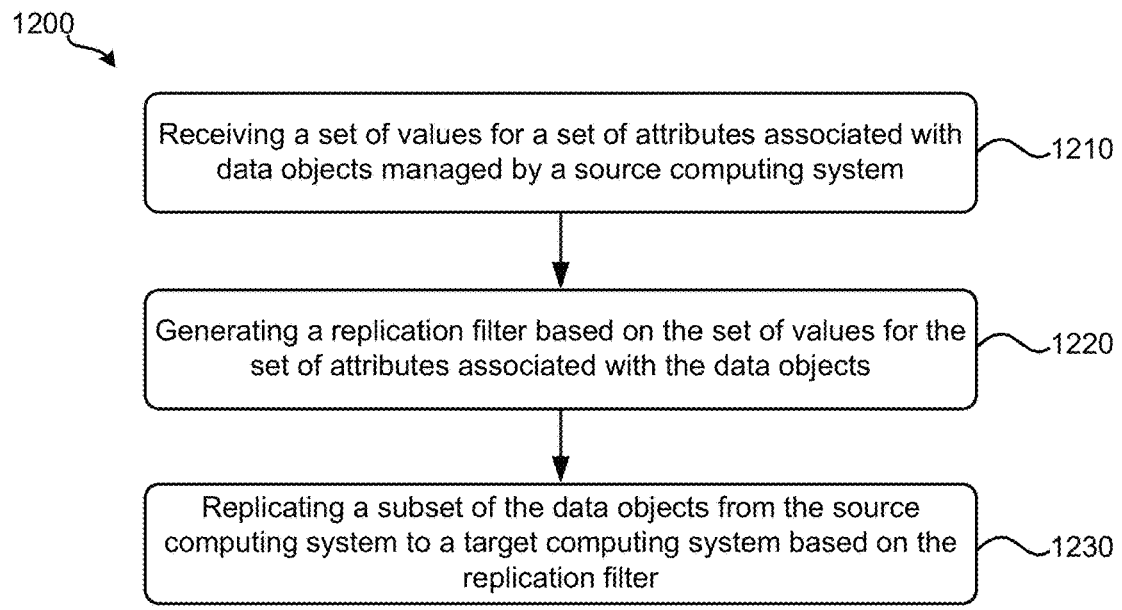
FIG. 12 illustrates a process for replicating data objects based on a replication filter according to some embodiments.

FIG. 12 illustrates a process 1200 for replicating data objects based on a replication filter according to some embodiments. In some embodiments, integration manager 125 performs process 1200. Process 1200 begins by receiving, at 1210, a set of values for a set of attributes associated with data objects managed by a source computing system. Referring to FIG. 1 as an example, a computing system 120 may be the source computing system, computing system 105 may be the target computing system, and data stored in database 130 may be the data objects. In some embodiments, the values for the set of attributes associated with the data objects are specified via GUI 1100 in the manner explained above by reference to FIG. 11. As described above, a replication filter can, alternatively or additionally, include identifier filters that filter data objects based on an identifier associated with the data objects. In some cases, process 1200 may receive a set of values for an identifier associated the data objects. These values may be specified via GUI 1100 in the manner explained above by reference to FIG. 11.

Next, process 1200 generates, at 1220, a replication filter based on the set of values for the set of attributes associated with the data objects. Referring to FIG. 11 as an example, process 1200 may generate the replication filter based on the specified attribute filters and/or identifier filters displayed in tables 1110 and 1135 upon receiving a selection of UI item 1175. In cases where process 1200 receives identifier filters, process 1200 generates the replication filter further based on the identifier filters.

Process 1200 then replicates, at 1230, a subset of the data objects from the source computing system to a target computing system based on the replication filter. In some embodiments, process 1200 performs operation 1230 by identifying data objects managed by the source computing system having the set of values for the set of attributes and replicating the identified data objects from the source computing system to the target computing system. Process 1200 does not replicate other data objects managed by the source computing system. As explained above, a replication filter can include identifier filters that filter data objects based on an identifier associated with the data objects. In such instances, process 1200 performs operation 1230 by identifying data objects managed by the source computing system having an identifier value that is specified in the replication filter and replicating the identified data objects from the source computing system to the target computing system.

V. Data Transmission to Computing Systems

In some embodiments, each computing system 120 can utilize a technique for transmitting data to computing system 105. For instance, each computing system 120 may be configured to transmit different types of data to computing system 105 using any number of different communication protocols. Each computing system 120 can also transmit data to any number of other computing systems (e.g., computing systems similar to computing system 105) using any number of different communication protocols. Additionally, each computing system 120 may transmit data to computing system 105 in different formats based on the type of the data. In some embodiments, each computing system 120 employs a logging feature that manages a log of data transmitted to computing system 105 and/or other computing systems.

Figure 13:
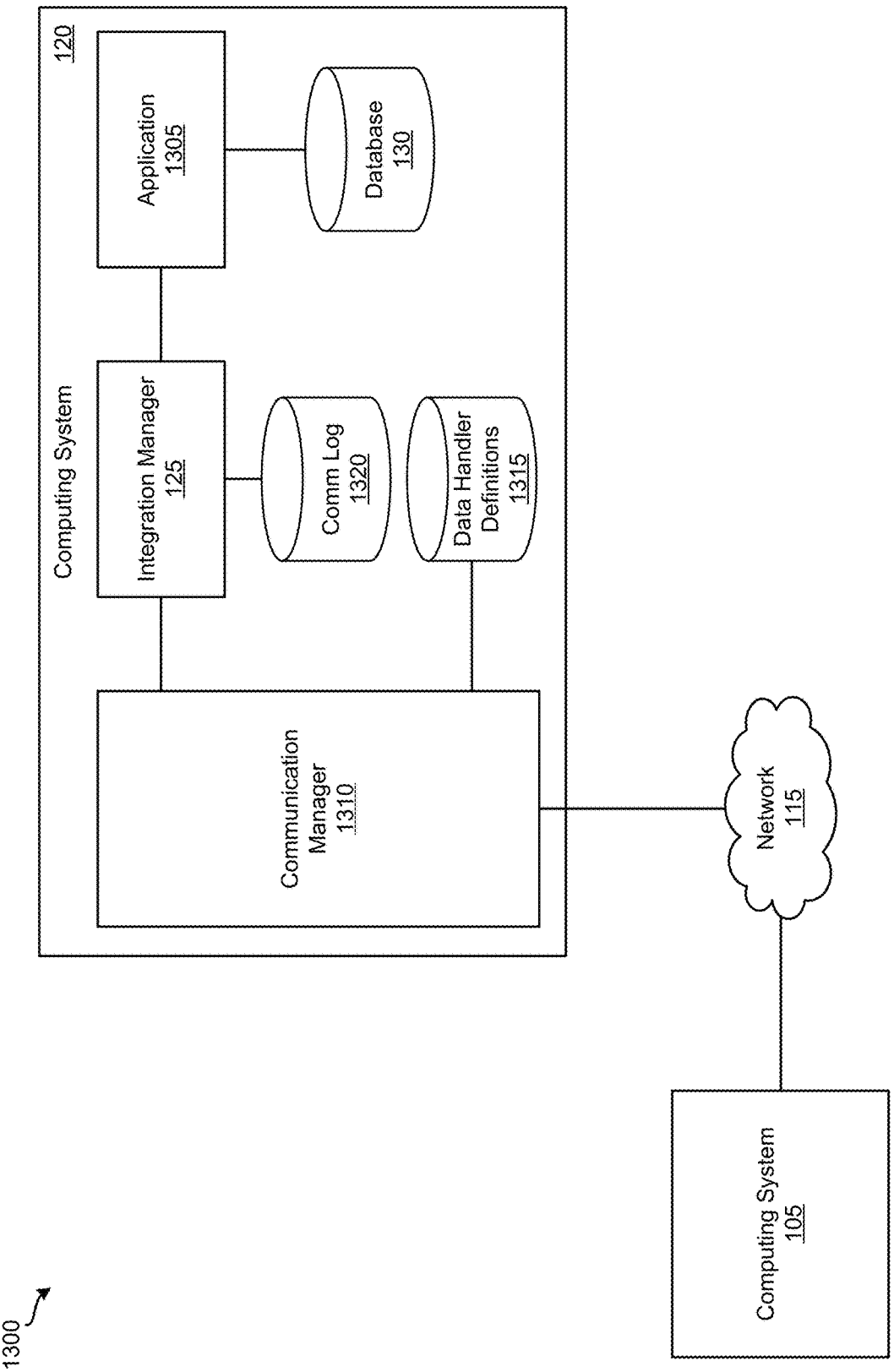
FIG. 13 illustrates a system for transmitting data according to some embodiments.

FIG. 13 illustrates a system 1300 for transmitting data according to some embodiments. As shown, system 1300 includes computing system 105, network 115, and a computing system 120. Computing system 120 includes communication manager 1310, integration manager 125, application 1305, database 130, and storages 1315 and 1320. Storage 1315 is configured to store data handler definitions while storage 1320 is configured to store communication logs.

Application 1305 is configured to send data objects to integration manager 125 for transmission to computing system 105 (or any other computing system). For example, application 1305 may identify and retrieve data objects from database 130 for transmission to computing system 105. Application 1305 then sends integration manager 125 a request to send data objects to computing system 105 along with the retrieved data objects. Application 1305 may receive a notification from integration manager 125 indicating the success and/or failure of the transmission of the data objects to computing system 105.

Integration manager 125 is responsible for facilitating the transmission of data objects to computing system 105. For instance, integration manager 125 may receive from application 1305 a request to transmit data objects to computing system 105 as well as the data objects themselves. In some embodiments, integration manager 125 may divide the received data objects into groups of data objects. Integration manager 125 may divide the data objects into different groups based on different criteria. For example, integration manager 125 can divide the data objects into group such that the size of each group of data objects does not exceed a defined size. As another example, integration manager 125 may divide the data objects into groups based on the type of data of the data objects so that each group of data objects includes data objects having the same type. After dividing the data objects into groups of data objects, integration manager 125 sends communication manager 1310 the data objects on a group-by-group basis for transmission to computing system 105.

In some embodiments, integration manager 125 manages and maintains a communication log associated with data objects request to be transmitted to computing system 105. Integration manager 125 stores the communication in communication log storage 1320. A data object may include an object ID for identifying the data object, an object type of the data object. When integration manager 125 receives a data object from application 1305, integration manager adds a record in to the communication log that includes the object ID of the data object, the object type of the data object, and a timestamp indicating a time at which integration manager 125 received the data object. In some embodiments, integration manager 125 includes additional and/or different information in the record. For instance, integration manager 125 may include a user ID associated with a user of application 1305 that requested the transmission of the data object.

After sending data objects to communication manager 1310 for transmission to computing system 105, integration manager 125 may receive results associated with the transmission from communication manager 1310. In some embodiments, the results may include a list of failed data objects, a list of successful data objects, and a list of messages associated with the data objects. The list of failed data objects can include, for each data object, the object ID of the data object and the object type of the data object. Similarly, the list of successful data objects can include, for each data object, the object ID of the data object and the object type of the data object. The list of messages may include, for each message, the object ID of a data object associated with the message and the object type of the data object. A message may include errors messages, warning messages, and/or other information associated with the transmission of the data object with which the message is associated.

Based on the results, integration manager 125 adds a record for each data object to the communication log that includes the object ID of the data object, the object type of the data object, a timestamp indicating a time at which integration manager 125 received the results for the data object, and operation information associated with the data object. The operation information may include an indication that the transmission was successful or failed. In some embodiments, the operation information can indicate the type of operation that was performed. For example, integration manager 125 may scan the communication log for an existing record that includes the same object ID and object type of the data object. If integration manager 125 finds such a record, integration manager 125 may indicate in the operation information that the transmission is an update operation. Otherwise, integration manager 125 may indicate in the operation information that the transmission is a create or new operation.

Communication manager 1310 is configured to manage the transmission of data from computing system 120 to computing system 105 via network 115. For example, communication manager 1310 may receive data objects from integration manager 125 along with a request to transmit them to computing system 105. Communication manager 1310 transmits data objects to computing system 105 based on data handler definitions stored in data handler definition storage 1315. In some embodiments, a data handler definition specifies the manner in which to transmit data to a computing system. For instance, a data handler definition for transmitting data objects to a computing system using a particular communication protocol can specify the computing system and a communication protocol (e.g., an HTTP communication protocol, an HTTP secure (HTTPS) communication protocol, a simple object access protocol (SOAP) communication protocol, an open data protocol (OData) communication protocol, etc.) to use to transmit data objects to the computing system. Different such data handler definitions may be defined to transmit data objects to different computing systems using different communication protocols.

As another example, a data handler definition for transmitting data objects to a computing system in a particular format (e.g., an extensible markup language (XML) format, a JavaScript Object Notation (JSON) format, etc.) can specify the computing system and a format in which to transmit data objects to the computing system. Different such data handler definitions may be defined to transmit data objects to different computing systems in different formats. As yet another example, a data handler definition for transmitting a particular type of data objects to a computing system in a particular format and/or using a particular communication protocol can specify the type of data object, the computing system, and a format in which to transmit the data objects and/or a communication protocol to use to transmit the type of data objects to the computing system. Different such data handler definitions may be defined to transmit different types of data objects to the same or different computing systems in different formats and/or using different communication protocols.

To transmit data objects to computing system 105 (or another computing system), communication manager 1310 determines the computing system to which the data objects are to be transmitted and/or the type of data objects and identifies a data handler definition in data handler definition storage 1315 based on the determined computing system and/or type of data objects. Communication manager 1310 then transmits the data objects to the destined computing system according to the communication protocol and/or format specified in the identifier data handler definition. After transmitting the data objects to the destined computing system, communication manager 1310 may receive results associated with the transmission of the data objects. Based on the results, communication manager 1310 generates a list of failed data objects, a list of successful data objects, and a list of messages that includes the information previously described above.

Figure 14:
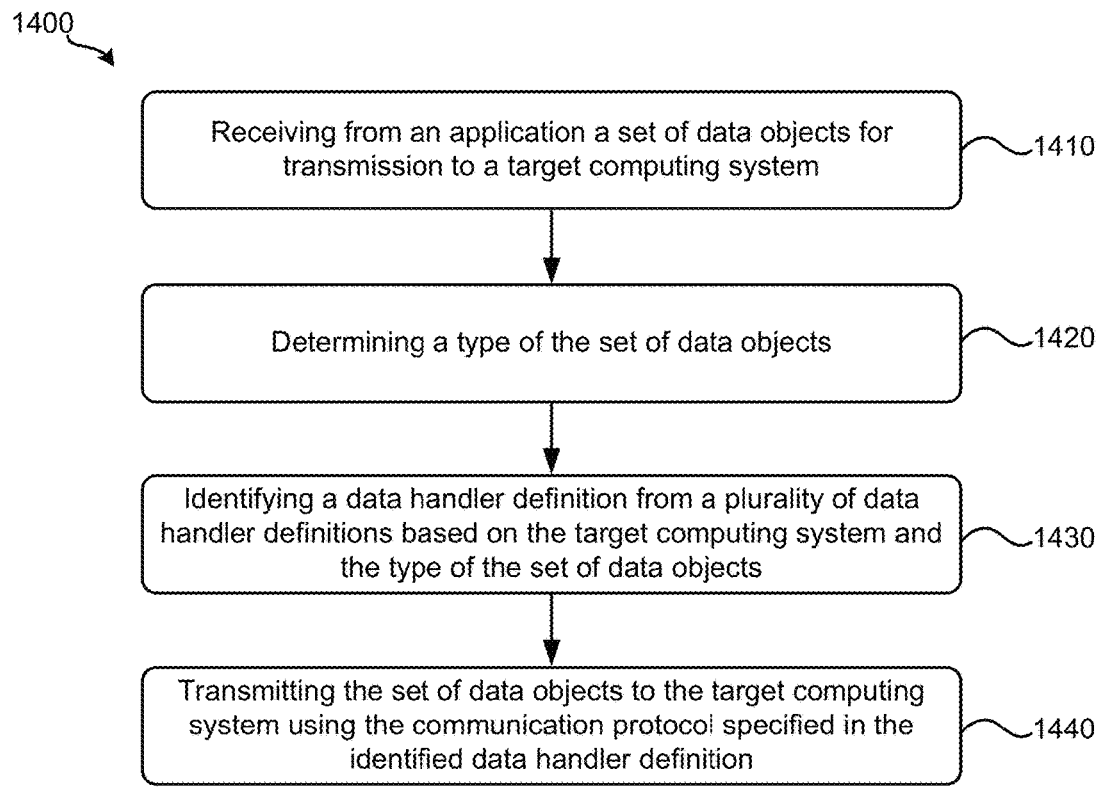
FIG. 14 illustrates a process for transmitting data according to some embodiments.

FIG. 14 illustrates a process 1400 for transmitting data according to some embodiments. In some embodiments, computing system 120 performs process 1400. Process 1400 starts by receiving, at 1410, from an application a set of data objects for transmission to a target computing system. Referring to FIG. 13 as an example, computing system 105 may be the target computing system and data stored in database 130 may be the data objects. In some embodiments, integration manager 125 performs operation 1410. Integration manager 125 logs the data objects in the same manner described above in some such embodiments.

Next, process 1400 determines, at 1420, a type of the set of data objects. Process 1400 then identifies, at 1430, a data handler definition from a plurality of data handler definitions based on the target computing system and the type of the set of data objects. In some embodiments, communication manager 1310 performs operation 1430. In some such embodiments, communication manager 1310 accesses data handler definition storage 1315 in order to identify the data hander definition from the data handler definitions stored in data handler definition storage 1315.

Finally, process 1400 transmits, at 1440, the set of data objects to the target computing system using the communication protocol specified in the identified data handler definition. In some cases, the identified data handler definition alternatively or additionally specifies a format in which to transmit data. In such cases, process 1400 transmits the set of data objects to the target computing system according the specified format and/or communication protocol.

The description provided above by reference to FIGS. 13 and 14 illustrate a technique for transmitting data to computing systems in response to a request from an application. One of ordinary skill in the art will recognize that, in some embodiments, the same and/or similar technique may be employed for replicating data from each computing system 120 to computing system 105. In some such embodiments, integration manager 125 acts as application 1305 (e.g., integration manager 125 requests for data objects to be transmitted to computing system 105, logs the request, divides the data objects to groups, sends communication manager 1310 the groups of data objects, receives and logs results of the transmission, etc.)

VI. Processing of Data Generated Based on Replicated Data

In some embodiments, one or more computing systems 120 may receive from computing system 105 data generated by computing system 105 based on data replicated from one or more computing systems 120 to computing system 105. Each computing system 120 may employs a technique for processing such data received from computing system 105. For instance, the data that a computing system 120 may receive from computing system 105 can include expense reports. Each expense report may include one or more expense entries. For each expense entry, computing system 120 may determine an entry use case and a tax use case associated with. Computing system 120 may also determine a report use case based on the expense report. Computing system 120 then processes each expense entry based on the entry use case and/or tax use case associated with the expense entry. Computing system 120 collectively processes the expense entries according to the report use case. Computing system 120 may then generate a document based on the processed expense entries.

Figure 15:
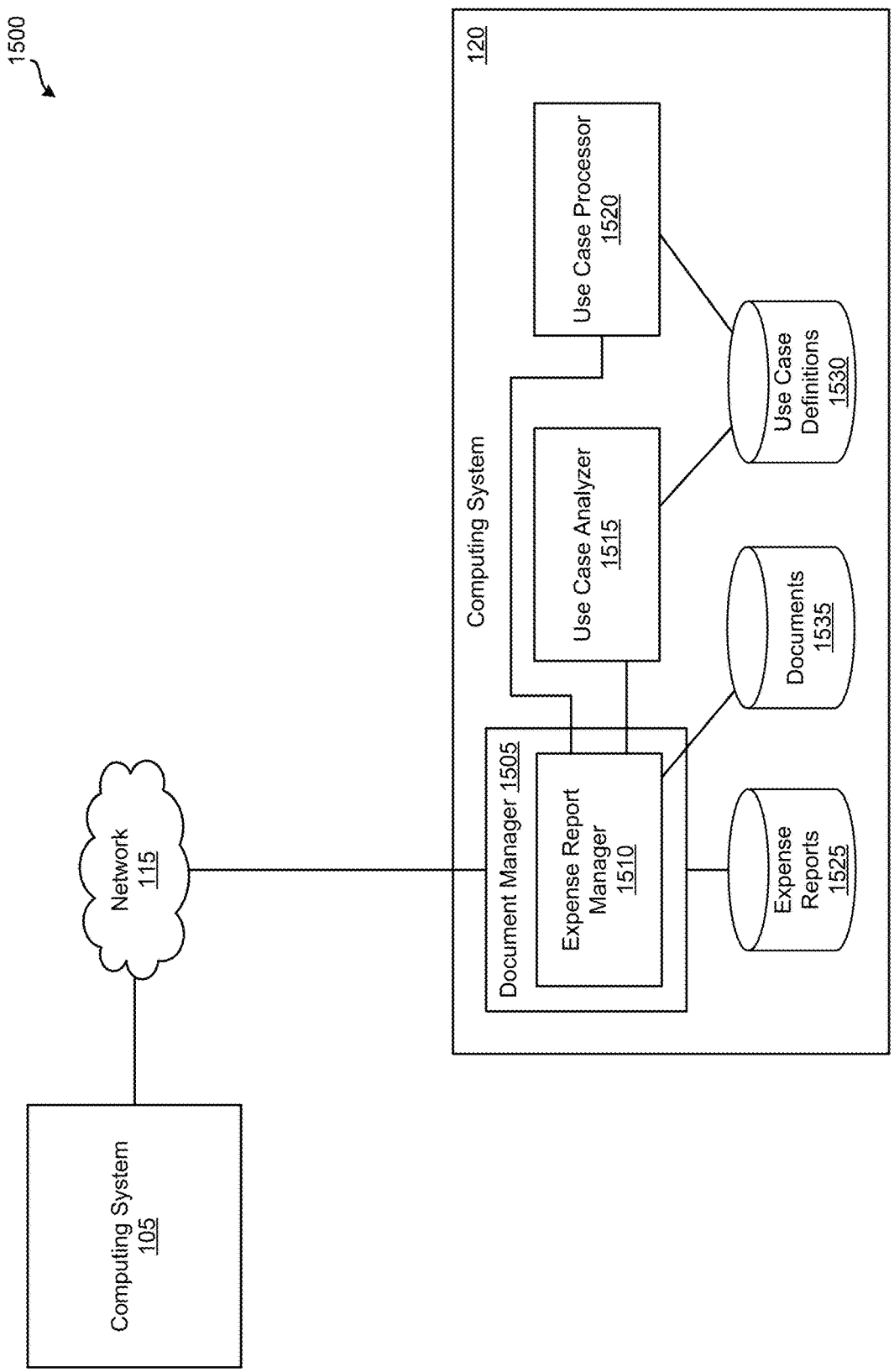
FIG. 15 illustrates a system for processing expense reports according to some embodiments.

FIG. 15 illustrates a system 1500 for processing expense reports according to some embodiments. As illustrated, system 1500 includes computing system 105, network 115, and computing system 120. Computing system 120 includes document manager 1505, use case analyzer 1515, use case processor 1520, and storages 1525-1535. Storage 1525 is configured to store expense reports, storage 1530 is configured to store use case definitions, and storage 1535 is configured to store documents generated from expense reports.

Document manager 1505 is responsible for receiving data from computing system 105 via network 110. In some embodiments, the received data is data that computing system 105 generated based on data replicated from computing system 120 and/or one or more other computing systems 120 (not shown). For this example, the data that document manager 1505 receives include expense reports. As shown, document manager 1505 includes expense report manager 1510. When document manager 1505 receives expense reports from computing system 105, document manager 1505 sends them to expense report manager 1510 for processing.

Expense report manager 1510 manages the processing of expense reports. When expense report manager 1510 receives an expense report from document manager 1505, expense report manager 1510 sends the expense report to use case analyzer 1515 for analysis. Expense report manager 1510 may receive from use case processor 1520 the expense report after use case processor 1520 has processed it. Based on the processed expense report, expense report manager 1510 generates a document and stores the document in documents storage 1535 for later retrieval, viewing, and/or further processing.

Use case analyzer 1515 is configured to determine use cases associated with expense reports and expense entries in the expense reports. For example, use case analyzer 1515 can receive an expense report from expense report manager 1510. The operation of use case analyzer 1515 will now be described by reference to FIGS. 16A and 16B, which illustrate parts of an expense report according to some embodiments. Specifically, FIG. 16A illustrates an example expense entry 1600 of the expense report and FIG. 16B illustrates another example expense entry 1605 of the expense report. As shown in FIGS. 16A and 16B, expense entries 1600 and 1605 include various data encoded in an XML format.

When use case analyzer 1515 receives the expense report in which expense entries 1600 and 1605 are included, use case analyzer 1515 identifies expense entry 1600 and analyzes it to determine an entry use case and a tax use case associated with expense entry 1600. In some embodiments, use case analyzer 1515 determines the entry use case associated with expense entry 1600 based on the value of the <journalPayee> field. The <journalPayee> field indicates an entity to which the expense associated with the expense entry is paid. A value of "EMPL" for the <journalPayee> field indicates the expense associated with the expense entry is paid to an employee, a value of "CBCP" for the <journalPayee> field indicates the expense associated with the expense entry is paid to a company credit card, and value of "COMP" for the <journalPayee> field indicates the expense associated with the expense entry is paid to a company (e.g., a company at which the employee is employed). For this example, a simple expense entry use case, a company billed company paid entry use case, and a private company billed company paid use case are defined and stored in use case definition storage 1350. Use case analyzer 1515 determines that an expense entry is associated with the simple expense entry use case when the value for the <journalPayee> field is "EMPL", determines that the expense entry is associated with the company billed company paid entry use case when the value for the <journalPayee> field is "CBCP", and determines that an expense entry is associated with the private company billed company paid expense entry use case when the value for the <journalPayee> field is "COMP". In this example, use case analyzer 1515 determines that expense entry 1600 is associated with the simple expense entry use case because the value for the <journalPayee> field in expense entry 1600 is "EMPL". In the example above, use case analyzer 1515 determines an entry use case for an expense entry based on the value of the <journalPayee> field. One of ordinary skill in the art will appreciate that additional and/or different fields may be used to determine an entry use case for an expense entry based on different entry use case definitions. For instance, entry use case definitions may specify the <journalPayee> field, the <journalPayer> field, the <entryIsPersonal> field, the <expensePayIndicator> field, etc. Any number of different combinations are possible.

Use case analyzer 1515 determines, in some embodiments, the tax use case associated with expense entry 1600 based on the number of tax entries in expense entry 1600. In this example, a single tax line tax use case and a multiple tax line tax use case are defined and stored in use case definition storage 1350. Use case analyzer 1515 determines that an expense entry is associated with the single tax line tax use case when the expense entry includes one tax entry and determines that the expense entry is associated with the multiple tax line tax use case when the expense entry includes more than one tax entry. Since expense entry 1600 includes one tax entry, use case analyzer 1515 determines that expense entry 1600 is associated with the single tax line tax entry use case in this example. In the example above, use case analyzer 1515 determines a tax use case for an expense entry based on the number of tax lines in an expense entry. One of ordinary skill in the art will appreciate that additional and/or different fields may be used to determine a tax use case for an expense entry based on different tax use case definitions.

Next, use case analyzer 1515 identifies expense entry 1605 and analyzes it to determine an entry use case and a tax use case associated with expense entry 1605 in the same manner described above by reference to expense entry 1600. For this example, use case analyzer 1515 determines that expense entry 1605 is associated with the simple expense entry use case as the value for the <journalPayee> field in expense entry 1600 is "EMPL". Use case analyzer 1515 determines that expense entry 1605 is associated with the single tax line tax entry use case in this example since expense entry 1605 includes one tax entry.

After determining entry use cases and tax use cases for each expense entry in the expense report, use case analyzer 1515 determines one or more report use cases associated with the expense report. In this example, a process cash advances report use case, a condense vendor lines report use case, and a default report use case are defined and stored in use case definition storage 1350. Use case analyzer 1515 determines that the expense report is associated with the process cash advances report use case when the expense report includes cash advances. Use case analyzer 1515 determines that the expense report is associated with the condense vendor lines report use case when the expense report includes multiple expenses paid to a same entity or vendor. Use case analyzer 1515 determines that the expense report is associated with the default report use case when the expense report is not determined to be associated with neither the process cash advances report use case nor the condense vendor lines report use case. FIG. 16C illustrates another part of the expense report illustrated in FIGS. 16A and 16B according to some embodiments. In particular, FIG. 16C shows report information 1610 included in the expense report. Report information 1610 includes employee data for one employee. In this example, expense entries 1600 and 1605 each includes an expense that is paid to this employee. Therefore, use case analyzer 1515 determines that the expense report is associated with the condense vendor lines report use case. Once use case analyzer 1515 determines the report use case associated with the expense report, use case analyzer 1515 stores the entry use case, tax use case, and report use case determinations in a table for access by use case processor 1520. Use case analyzer 1515 then sends use case processor 1520 the expense report for processing. In the example above, use case analyzer 1515 determines one report use case for an expense report. One of ordinary skill in the art will appreciate that additional and/or different report use cases may be determined for an expense report.

Use case processor 1520 is configured to process expense reports received from use case analyzer 1515. When use case processor 1520 receives an expense report, use case processes each expense entry first and then processes the expense report. To process an expense entry, use case processor 1520 accesses the table mentioned above that stores the entry use case and tax entry use case associated with expense entries in the expense report. Based on the entry use case associated with the expense entry, use case processor 1520 identifies an entry use case definition stored in use case definitions storage 1530. In some embodiments, a use case definition specifies operations to perform to process an expense entry. Referring to FIG. 16A as an example, use case processor 1520 identifies the simple expense entry use case definition in use case definitions storage 1530 and performs the operations specified in the simple expense entry use case definition. Next, use case processor 1520 identifies a tax use case definition stored in use case definitions storage 1530 based on the tax use case associated with the expense entry. Referring to FIG. 16A as an example, use case processor 1520 identifies the single tax line tax use case definition in use case definitions storage 1530 and performs the operations specified in the single tax line tax entry use case definition.

After processing the expense entries according to their associated entry use cases and tax use cases, use case processor 1520 processes the expense report by accessing the table mentioned above that stores the report use case associated with expense report. Use case processor 1520 identifies one or more report use case definitions stored in use case definitions storage 1530 based on the one or more report use cases associated with the expense report. Referring to FIGS. 16A-C as an example, use case processor 1520 identifies the condense vendor lines use case definition in use case definitions storage 1530 and performs the operations specified in the condense vendor lines use case definition. Once use case processor 1520 has processed the expense report, use case processor 1520 sends the processed expense report to expense report manager 1510.

The description provided above by reference to FIGS. 15-18 illustrate example entry use case definitions, tax use case definitions, report use case definitions, and the corresponding processes of the uses cases. One of ordinary skill in the art will appreciated that any number of different use cases and corresponding processing for the use cases may be defined for any of the different types of use cases in some embodiments.

Figure 17:
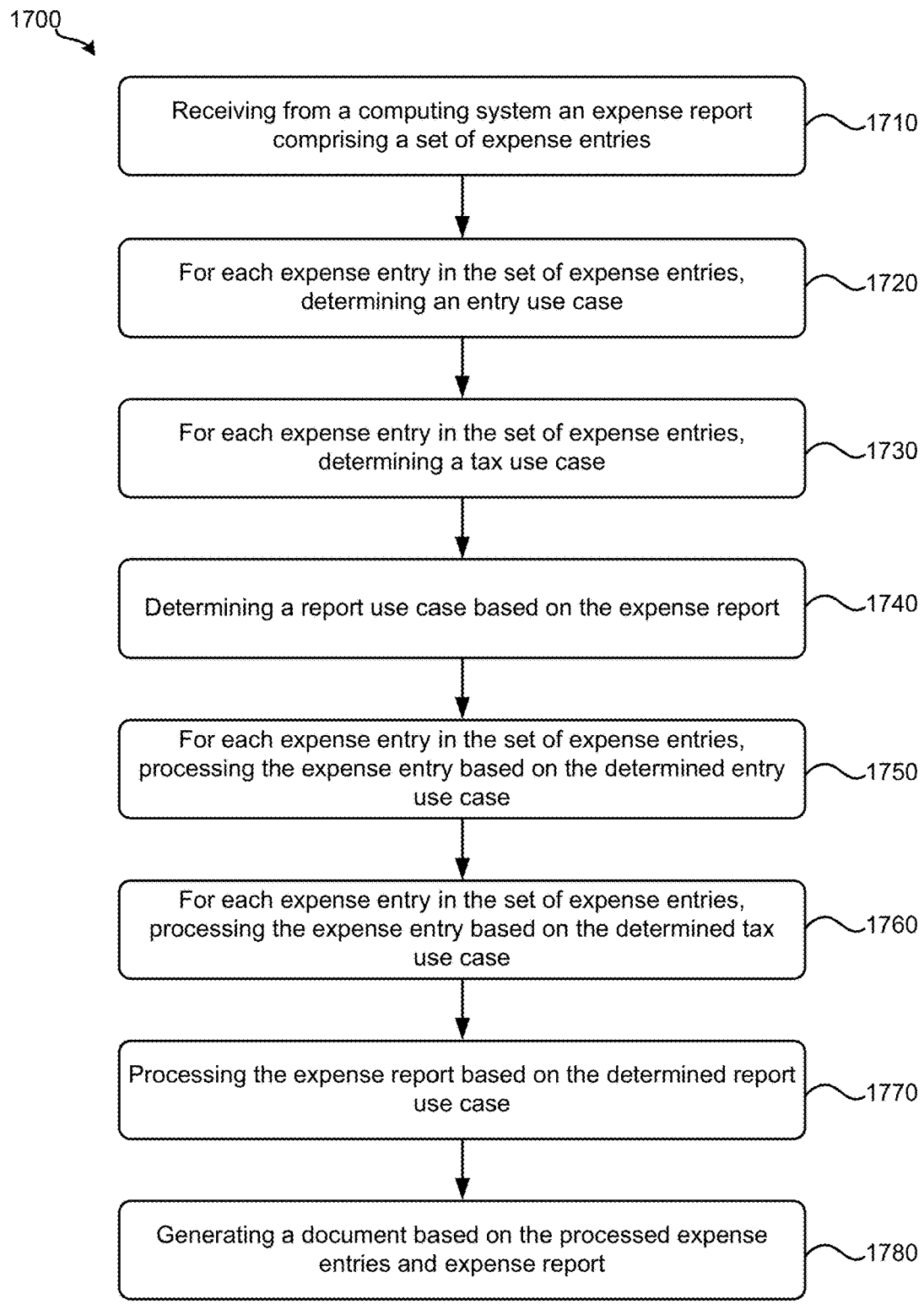
FIG. 17 illustrates a process for processing an expense report according to some embodiments.

FIG. 17 illustrates a process 1700 for processing an expense report according to some embodiments. In some embodiments, computing system 120 performs process 1700. Process 1700 begins by receiving, at 1710, from a computing system data comprising a set of expense entries. Referring to FIG. 15 as an example, computing system 105 may be the computing system. The data may be the expense report illustrated in FIGS. 16A-C. In some embodiments, document manager 1505 performs operation 1510. Document manager 1505 sends the data to expense report manager 1510 in some such embodiments.

Next, process 1700 determines, at 1720, an entry use case for each expense entry in the set of expense entries. Referring to FIGS. 16A and 16B as an example, process 1700 determines the entry use case associated with expense entries 1600 and 1605 based on the value of the <journalPayee> field. For this example, process 1700 determines that expense entries 1600 and 1605 are associated with the simple expense entry use case as the value for the <journalPayee> field in expense entries 1600 and 1605 is "EMPL".

Process 1700 then determines, at 1730, a tax use case for each expense entry in the set of expense entries. Referring to FIGS. 16A and 16B as an example, process 1700 determines the tax use case associated with expense entries 1600 and 1605 based on the number of tax entries in expense entries 1600 and 1605. In this example, process 1700 determines that expense entries 1600 and 1605 are associated with the single tax line tax use case because each of the expense entries 1600 and 1605 includes one tax entry.

Next, process 1700 determines, at 1740, a set of report use case based on the expense report. Referring to FIGS. 16A-C as an example, process 1700 determines that the expense report is associated with a condense vendor lines report use case since report information 1610 includes employee data for one employee and expense entries 1600 and 1605 each includes an expense that is paid to this employee. Process 1700 then processes, at 1750, an expense entry based on the determined entry use case for each expense entry in the set of expense entries. To process an expense entry, process 1700 identifies an entry use case definition stored in use case definitions storage 1530 based on the entry use case associated with the expense entry and performs the operations specified in the identified entry use case definition.

Next, process 1700 processes, at 1760, an expense entry based on the determined tax use case for each expense entry in the set of expense entries. Process 1700 processes an expense entry by identifying a tax use case definition stored in use case definitions storage 1530 based on the tax use case associated with the expense entry and performing the operations specified in the identified tax use case definition. Process 1700 then, processes, at 1770, the expense report based on the determine set of report use cases. To process the expense report, process 1700 identifies a set of report use case definitions stored in use case definitions storage 1530 based on the set of report use cases associated with the expense report and performs the operations specified in the identified report use case definition.

Finally, process 1700 generates, at 1780, a document based on the processed expense entries and the processed expense report. FIG. 18 illustrates an example document 1800 generated based on processed expense entries and a processed expense report according to some embodiments. Specifically, document 1800 is generated based on the processed expense entries and the processed expense reported illustrated in FIGS. 16A-C. As shown, document 1800 includes five items. The first item shows a debit line that includes an expense paid to a vendor (e.g., an employee) with an amount that has been consolidated from expense entries 1600 and 1605. The second item shows the non-tax amount of the expense in expense entry 1600 while the third item shows the tax amount of the expense in expense entry 1600. The fourth item shows the non-tax amount of the expense in expense entry 1605 and the fifth item shows the tax amount of the expense in expense entry 1605. The second, third, fourth, and fifth items show credit lines. The total amount of these credit lines is equal to the debit line of the first item. That is, the credit lines and the debit lines are balanced.

VII. Example Computer System

Figure 19:
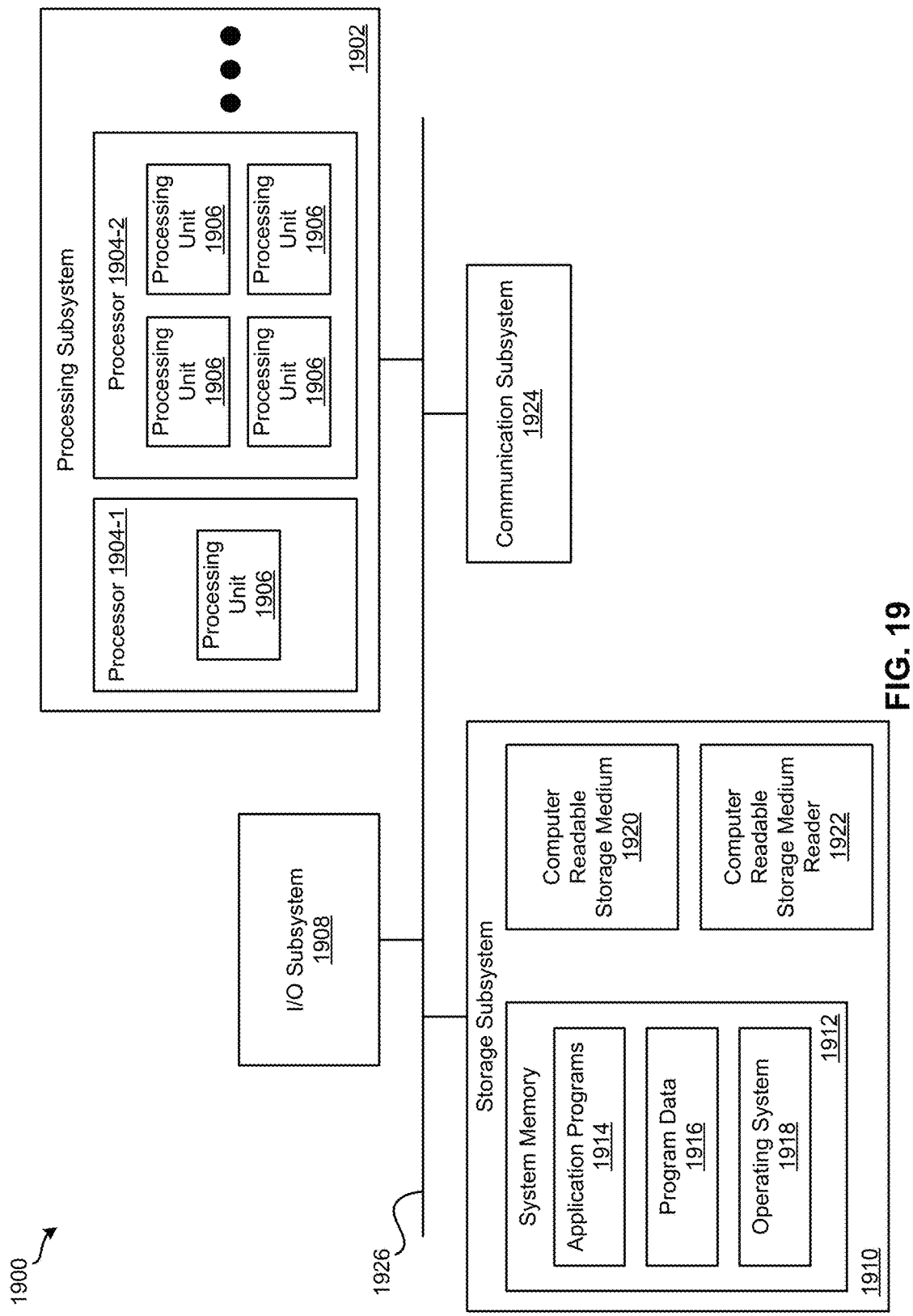
FIG. 19 illustrates an exemplary computer system for implementing various embodiments described above.

FIG. 19 illustrates an exemplary computer system 1900 for implementing various embodiments described above. For example, computer system 1900 may be used to implement computing system 105 and computing systems 120a-n. Computer system 1900 may be a desktop computer, a laptop, a server computer, or any other type of computer system or combination thereof. Computer system 1900 can implement many of the operations, methods, and/or processes described above (e.g., processes 400, 700, 1000, 1200, 1400, and 1700). As shown in FIG. 19, computer system 1900 includes processing subsystem 1902, which communicates, via bus subsystem 1926, with input/output (I/O) subsystem 1908, storage subsystem 1910 and communication subsystem 1924.

Bus subsystem 1926 is configured to facilitate communication among the various components and subsystems of computer system 1900. While bus subsystem 1926 is illustrated in FIG. 19 as a single bus, one of ordinary skill in the art will understand that bus subsystem 1926 may be implemented as multiple buses. Bus subsystem 1926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1902, which can be implemented as one or more integrated circuits (e.g., a conventional microprocessor or microcontroller), controls the operation of computer system 1900. Processing subsystem 1902 may include one or more processors 1904. Each processor 1904 may include one processing unit 1906 (e.g., a single core processor such as processor 1904-1) or several processing units 1906 (e.g., a multicore processor such as processor 1904-2). In some embodiments, processors 1904 of processing subsystem 1902 may be implemented as independent processors while, in other embodiments, processors 1904 of processing subsystem 1902 may be implemented as multiple processors integrate into a single chip or multiple chips. Still, in some embodiments, processors 1904 of processing subsystem 1902 may be implemented as a combination of independent processors and multiple processors integrated into a single chip or multiple chips.

In some embodiments, processing subsystem 1902 can execute a variety of programs or processes in response to program code and can maintain multiple concurrently executing programs or processes. At any given time, some or all of the program code to be executed can reside in processing subsystem 1902 and/or in storage subsystem 1910. Through suitable programming, processing subsystem 1902 can provide various functionalities, such as the functionalities described above by reference to processes 400, 700, 1000, 1200, 1400, 1700, etc.

I/O subsystem 1908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1900 to a user or another device (e.g., a printer).

As illustrated in FIG. 19, storage subsystem 1910 includes system memory 1912, computer-readable storage medium 1920, and computer-readable storage medium reader 1922. System memory 1912 may be configured to store software in the form of program instructions that are loadable and executable by processing subsystem 1902 as well as data generated during the execution of program instructions. In some embodiments, system memory 1912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1912 may include different types of memory, such as static random access memory (SRAM) and/or dynamic random access memory (DRAM). System memory 1912 may include a basic input/output system (BIOS), in some embodiments, that is configured to store basic routines to facilitate transferring information between elements within computer system 1900 (e.g., during start-up). Such a BIOS may be stored in ROM (e.g., a ROM chip), flash memory, or any other type of memory that may be configured to store the BIOS.

As shown in FIG. 19, system memory 1912 includes application programs 1914 (e.g., application 1305), program data 1916, and operating system (OS) 1918. OS 1918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1920 may be a non-transitory computer-readable medium configured to store software (e.g., programs, code modules, data constructs, instructions, etc.). Many of the components (e.g., integration manager 125, configuration manager 305, HTTP handler 310, application 1305, communication manager 1310, document manager 1505, expense report manager 1510, use case analyzer 1515, and use case processor 1520) and/or processes (e.g., processes 400, 700, 1000, 1200, 1400, and 1700) described above may be implemented as software that when executed by a processor or processing unit (e.g., a processor or processing unit of processing subsystem 1902) performs the operations of such components and/or processes. Storage subsystem 1910 may also store data used for, or generated during, the execution of the software.

Storage subsystem 1910 may also include computer-readable storage medium reader 1922 that is configured to communicate with computer-readable storage medium 1920. Together and, optionally, in combination with system memory 1912, computer-readable storage medium 1920 may comprehensively represent remote, local, fixed, and/or removable storage devices plus storage media for temporarily and/or more permanently containing, storing, transmitting, and retrieving computer-readable information.

Computer-readable storage medium 1920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1924 serves as an interface for receiving data from, and transmitting data to, other devices, computer systems, and networks. For example, communication subsystem 1924 may allow computer system 1900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1924 may provide components configured for wired communication (e.g., Ethernet) in addition to or instead of components configured for wireless communication.

One of ordinary skill in the art will realize that the architecture shown in FIG. 19 is only an example architecture of computer system 1900, and that computer system 1900 may have additional or fewer components than shown, or a different configuration of components. The various components shown in FIG. 19 may be implemented in hardware, software, firmware or any combination thereof, including one or more signal processing and/or application specific integrated circuits.

VIII. Example System

Figure 20:
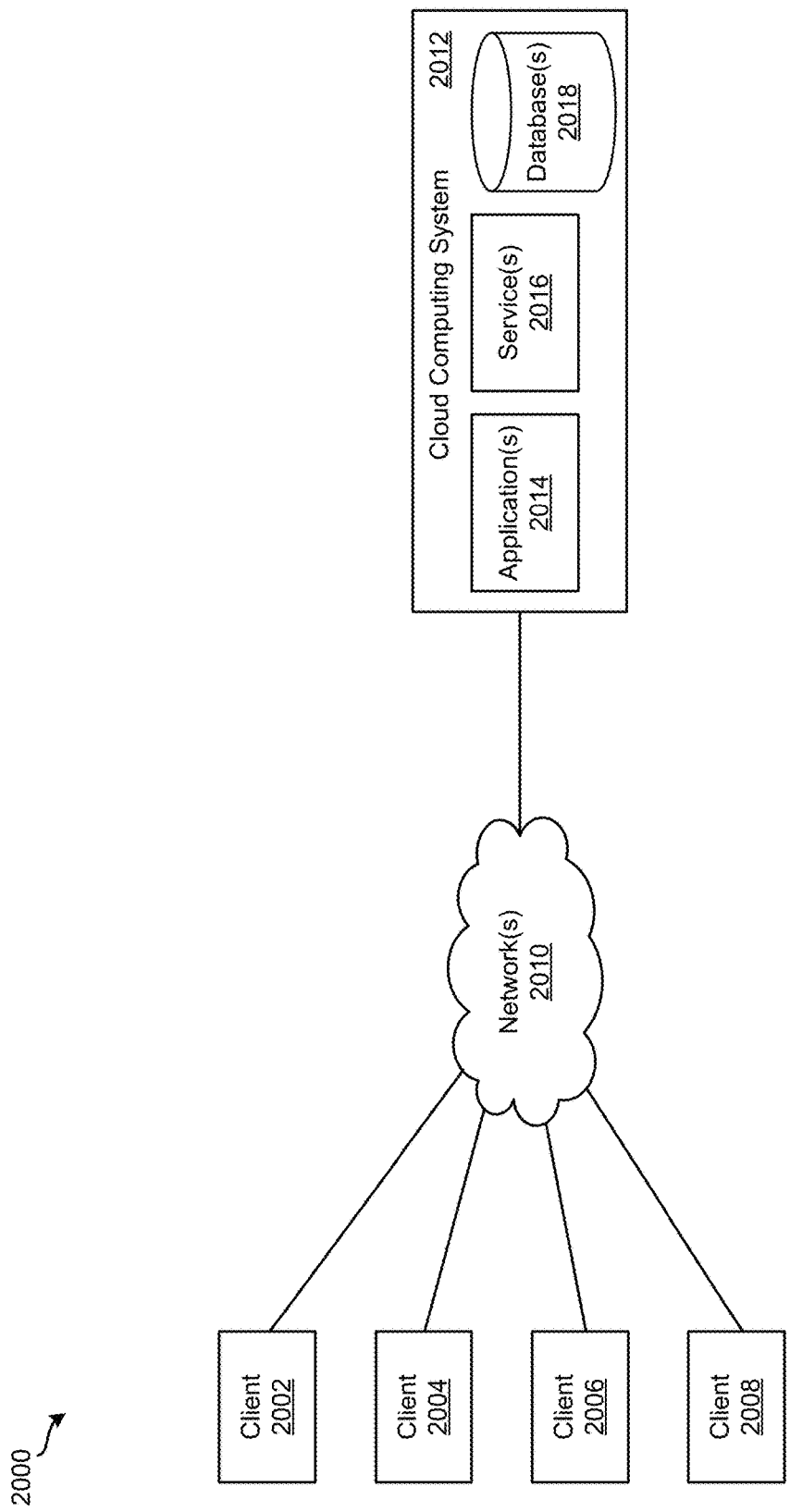
FIG. 20 illustrates an exemplary system for implementing various embodiments described above.

FIG. 20 illustrates an exemplary system 2000 for implementing various embodiments described above. For example, cloud computing system 2012 of system 2000 may be used to implement computing system 105 and computing systems 120*a-n*. As shown, system 2000 includes client devices 2002-2008, one or more networks 2010, and cloud computing system 2012. Cloud computing system 2012 is configured to provide resources and data to client devices 2002-2008 via networks 2010. In some embodiments, cloud computing system 2000 provides resources to any number of different users (e.g., customers, tenants, organizations, etc.). Cloud computing system 2012 may be implemented by one or more computer systems (e.g., servers), virtual machines operating on a computer system, or a combination thereof.

As shown, cloud computing system 2012 includes one or more applications 2014, one or more services 2016, and one or more databases 2018. Cloud computing system 2000 may provide applications 2014, services 2016, and databases 2018 to any number of different customers in a self-service, subscription-based, elastically scalable, reliable, highly available, and secure manner.

In some embodiments, cloud computing system 2000 may be adapted to automatically provision, manage, and track a customer's subscriptions to services offered by cloud computing system 2000. Cloud computing system 2000 may provide cloud services via different deployment models. For example, cloud services may be provided under a public cloud model in which cloud computing system 2000 is owned by an organization selling cloud services and the cloud services are made available to the general public or different industry enterprises. As another example, cloud services may be provided under a private cloud model in which cloud computing system 2000 is operated solely for a single organization and may provide cloud services for one or more entities within the organization. The cloud services may also be provided under a community cloud model in which cloud computing system 2000 and the cloud services provided by cloud computing system 2000 are shared by several organizations in a related community. The cloud services may also be provided under a hybrid cloud model, which is a combination of two or more of the aforementioned different models.

In some instances, any one of applications 2014, services 2016, and databases 2018 made available to client devices 2002-2008 via networks 2010 from cloud computing system 2000 is referred to as a "cloud service." Typically, servers and systems that make up cloud computing system 2000 are different from the on-premises servers and systems of a customer. For example, cloud computing system 2000 may host an application and a user of one of client devices 2002-2008 may order and use the application via networks 2010.

Applications 2014 may include software applications that are configured to execute on cloud computing system 2012 (e.g., a computer system or a virtual machine operating on a computer system) and be accessed, controlled, managed, etc. via client devices 2002-2008. In some embodiments, applications 2014 may include server applications and/or mid-tier applications (e.g., HTTP (hypertext transport protocol) server applications, FTP (file transfer protocol) server applications, CGI (common gateway interface) server applications, JAVA server applications, etc.). Services 2016 are software components, modules, application, etc. that are configured to execute on cloud computing system 2012 and provide functionalities to client devices 2002-2008 via networks 2010. Services 2016 may be web-based services or on-demand cloud services.

Databases 2018 are configured to store and/or manage data that is accessed by applications 2014, services 2016, and/or client devices 2002-2008. For instance, storage 110 and/or databases 130*a-n* may be stored in databases 2018. Databases 2018 may reside on a non-transitory storage medium local to (and/or resident in) cloud computing system 2012, in a storage-area network (SAN), on a non-transitory storage medium local located remotely from cloud computing system 2012. In some embodiments, databases 2018 may include relational databases that are managed by a relational database management system (RDBMS). Databases 2018 may be a column-oriented databases, row-oriented databases, or a combination thereof. In some embodiments, some or all of databases 2018 are in-memory databases. That is, in some such embodiments, data for databases 2018 are stored and managed in memory (e.g., random access memory (RAM)).

Client devices 2002-2008 are configured to execute and operate a client application (e.g., a web browser, a proprietary client application, etc.) that communicates with applications 2014, services 2016, and/or databases 2018 via networks 2010. This way, client devices 2002-2008 may access the various functionalities provided by applications 2014, services 2016, and databases 2018 while applications 2014, services 2016, and databases 2018 are operating (e.g., hosted) on cloud computing system 2000. Client devices 2002-2008 may be computer system 1000, as described above by reference to FIG. 19. Although system 2000 is shown with four client devices, any number of client devices may be supported.

Networks 2010 may be any type of network configured to facilitate data communications among client devices 2002-2008 and cloud computing system 2012 using any of a variety of network protocols. Networks 2010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

receiving from a first computing system an expense report comprising a set of expense entries, wherein each expense entry in the set of expense entries comprises a set of fields, wherein the set of expense entries of the expense report is generated by the first computing system based on data replicated from a second computing system to the first computing system;

determining, for each expense entry in the set of expense entries of the expense report, an entry use case from a plurality of entry use cases based on a plurality of use case entry definitions associated with the plurality of entry use cases, wherein each use case entry definition in the plurality of entry use case definitions specifies a value for a field, wherein the entry use case definition associated with the determined entry use case for each expense entry in the set of expense entries specifies a value for a field that is the same as the value for a corresponding field in the expense entry;

processing, for each expense entry in the set of expense entries of the expense report, the expense entry based on the determined entry use case; and generating a document based on the processed set of expense entries of the expense report.

2. The non-transitory machine-readable medium of claim 1, wherein the program further comprises sets of instructions for:

determining, for each expense entry in the set of expense entries of the expense report, a tax use case; and processing, for each expense entry in the set of expense entries of the expense report, the expense entry based on the determined tax use case.

3. The non-transitory machine-readable medium of claim 1, wherein the program further comprises sets of instructions for:

determining a report use case based on the set of expense entries of the expense report; and processing the set of expense entries of the expense report based on the determined report use case.

4. The non-transitory machine-readable medium of claim 3, wherein processing the set of entries of the expense report based on the determined report use case comprises consolidating expenses in at least two expense entries of the expense report into a single expense.

5. The non-transitory machine-readable medium of claim 1, wherein determining the entry use case for each expense entry in the set of expense entries of the expense report comprises identifying data indicating a payee associated with an expense, wherein determining the entry use case is based on the data indicating the payee associated with the expense.

6. The non-transitory machine-readable medium of claim 1, wherein the program further comprises a set of instructions for storing the expense report in a storage of the computing device.

7. The non-transitory machine-readable medium of claim 1, wherein the program further comprises a set of instructions for storing the generated document in a storage in of the computing device for later viewing.

8. A method, executable by a computing device, comprising:

receiving from a first computing system an expense report comprising a set of expense entries, wherein each expense entry in the set of expense entries comprises a set of fields, wherein the set of expense entries of the expense report is generated by the first computing system based on data replicated from a second computing system to the first computing system;

determining, for each expense entry in the set of expense entries of the expense report, an entry use case from a plurality of entry use cases based on a plurality of use case entry definitions associated with the plurality of entry use cases, wherein each use case entry definition in the plurality of entry use case definitions specifies a value for a field, wherein the entry use case definition associated with the determined entry use case for each expense entry in the set of expense entries specifies a value for a field that is the same as the value for a corresponding field in the expense entry;

processing, for each expense entry in the set of expense entries of the expense report, the expense entry based on the determined entry use case; and generating a document based on the processed set of expense entries of the expense report.

9. The method of claim 8 further comprising:

determining, for each expense entry in the set of expense entries of the expense report, a tax use case; and processing, for each expense entry in the set of expense entries of the expense report, the expense entry based on the determined tax use case.

10. The method of claim 8 further comprising:

determining a report use case based on the set of expense entries of the expense report; and processing the set of expense entries of the expense report based on the determined report use case.

11. The method of claim 10, wherein processing the set of entries of the expense report based on the determined report use case comprises consolidating expenses in at least two expense entries of the expense report into a single expense.

12. The method of claim 8, wherein determining the entry use case for each expense entry in the set of expense entries of the expense report comprises identifying data indicating a payee associated with an expense, wherein determining the entry use case is based on the data indicating the payee associated with the expense.

13. The method of claim 8, further comprising storing the expense report in a storage of the computing device.

14. The method of claim 8 further comprising storing the generated document in a storage of the computing device for later viewing.

15. A system comprising:

a set of processing units; and a non-transitory computer-readable medium storing instructions that when executed by at least one processing unit in the set of processing units cause the at least one processing unit to:

receive from a first computing system an expense report comprising a set of expense entries, wherein each expense entry in the set of expense entries comprises a set of fields, wherein the set of expense entries of the expense report is generated by the first computing system based on data replicated from a second computing system to the first computing system;

determine, for each expense entry in the set of expense entries of the expense report, an entry use case from a plurality of entry use cases based on a plurality of use case entry definitions associated with the plurality of entry use cases, wherein each use case entry definition in the plurality of entry use case definitions specifies a value for a field, wherein the entry use case definition associated with the determined entry use case for each expense entry in the set of expense entries specifies a value for a field that is the same as the value for a corresponding field in the expense entry;

process, for each expense entry in the set of expense entries of the expense report, the expense entry based on the determined entry use case; and generate a document based on the processed set of expense entries of the expense report.

16. The system of claim 15, wherein the instructions further cause the at least one processing unit to:

determine, for each expense entry in the set of expense entries of the expense report, a tax use case; and process, for each expense entry in the set of expense entries of the expense report, the expense entry based on the determined tax use case.

17. The system of claim 15, wherein the instructions further cause the at least one processing unit to:

determine a report use case based on the set of expense entries of the expense report; and process the set of expense entries of the expense report based on the determined report use case, wherein processing the set of entries of the expense report based on the determined report use case comprises consolidating expenses in at least two expense entries of the expense report into a single expense.

18. The system of claim 15, wherein determining the entry use case for each expense entry in the set of expense entries of the expense report comprises identifying data indicating a payee associated with an expense, wherein determining the entry use case is based on the data indicating the payee the payer associated with the expense.

19. The system of claim 15, wherein the instructions further cause the at least one processing unit to store the expense report in a storage of the system.

20. The system of claim 15, wherein the instructions further cause the at least one processing unit to store the generated document in a storage of the system for later viewing.

* * * * *